(12) United States Patent
Georgiev et al.

(10) Patent No.: US 9,838,601 B2
(45) Date of Patent: Dec. 5, 2017

(54) MULTI-CAMERA SYSTEM USING FOLDED OPTICS

(71) Applicant: QUALCOMM Incorporated, San Diego, CA (US)

(72) Inventors: Todor Georgiev Georgiev, Sunnyvale, CA (US); Thomas Wesley Osborne, San Diego, CA (US); Sergiu Radu Goma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/183,043

(22) Filed: Jun. 15, 2016

(65) Prior Publication Data
US 2016/0295112 A1 Oct. 6, 2016

Related U.S. Application Data

(63) Continuation of application No. 13/837,098, filed on Mar. 15, 2013, now Pat. No. 9,398,264.
(Continued)

(51) Int. Cl.
*H04N 5/225* (2006.01)
*G02B 13/16* (2006.01)
(Continued)

(52) U.S. Cl.
CPC ..... *H04N 5/23238* (2013.01); *G02B 13/0065* (2013.01); *G06T 3/4038* (2013.01);
(Continued)

(58) Field of Classification Search
CPC .. H04N 5/23238; H04N 5/247; H04N 5/3415; H04N 3/1593; G03B 37/00; G03B 37/04
(Continued)

(56) References Cited

U.S. PATENT DOCUMENTS 3,698,803 A 10/1972 Toshio
4,114,171 A 9/1978 Altman
(Continued)

FOREIGN PATENT DOCUMENTS

CN 101201459 A 6/2008
CN 101571666 A 11/2009
(Continued)

OTHER PUBLICATIONS

Arican, et al., "Intermediate View Generation for Perceived Depth Adjustment of Sterio Video", Mitsubishi Electric Research Laboratories, http://www.merl.com, TR2009-052, Sep. 2009; 12 pages.
(Continued)

*Primary Examiner* — Kelly L Jerabek

(57) ABSTRACT

Described herein are methods and devices that employ a plurality of image sensors to capture a target image of a scene. As described, positioning at least one reflective or refractive surface near the plurality of image sensors enables the sensors to capture together an image of wider field of view and longer focal length than any sensor could capture individually by using the reflective or refractive surface to guide a portion of the image scene to each sensor. The different portions of the scene captured by the sensors may overlap, and may be aligned and cropped to generate the target image.

28 Claims, 15 Drawing Sheets

SENSOR ASSEMBLY

Related U.S. Application Data

(60) Provisional application No. 61/716,339, filed on Oct. 19, 2012.

(51) Int. Cl.

| | | |
|---|---|---|
| *H04N 5/232* | (2006.01) | |
| *H04N 7/18* | (2006.01) | |
| *G06T 3/40* | (2006.01) | |
| *G02B 13/00* | (2006.01) | |
| *H04N 5/247* | (2006.01) | |
| *H04N 5/341* | (2011.01) | |
| *H04N 5/262* | (2006.01) | |

(52) U.S. Cl.
CPC ......... *H04N 5/2254* (2013.01); *H04N 5/2257* (2013.01); *H04N 5/247* (2013.01); *H04N 5/3415* (2013.01); *H04N 7/18* (2013.01)

(58) Field of Classification Search
USPC .................... 348/36, 38–39, 218.1, 239, 262
See application file for complete search history.

(56) References Cited

U.S. PATENT DOCUMENTS

| | | | |
|---|---|---|---|
| 4,437,745 A | 3/1984 | Hajnal | |
| 4,639,586 A | 1/1987 | Fender et al. | |
| 4,740,780 A | 4/1988 | Brown et al. | |
| 4,751,570 A | 6/1988 | Robinson | |
| 5,012,273 A | 4/1991 | Nakamura et al. | |
| 5,016,109 A | 5/1991 | Gaylord | |
| 5,063,441 A | 11/1991 | Lipton et al. | |
| 5,142,357 A | 8/1992 | Lipton et al. | |
| 5,194,959 A | 3/1993 | Kaneko et al. | |
| 5,207,000 A | 5/1993 | Chang et al. | |
| 5,231,461 A | 7/1993 | Silvergate et al. | |
| 5,243,413 A | 9/1993 | Gitlin et al. | |
| 5,313,542 A | 5/1994 | Castonguay | |
| 5,475,617 A | 12/1995 | Castonguay | |
| 5,506,913 A | 4/1996 | Ibison et al. | |
| 5,539,483 A | 7/1996 | Nalwa | |
| 5,606,627 A | 2/1997 | Kuo | |
| 5,614,941 A | 3/1997 | Hines | |
| 5,640,222 A | 6/1997 | Paul | |
| 5,642,299 A | 6/1997 | Hardin et al. | |
| 5,686,960 A | 11/1997 | Sussman et al. | |
| 5,721,585 A | 2/1998 | Keast et al. | |
| 5,734,507 A | 3/1998 | Harvey | |
| 5,745,305 A | 4/1998 | Nalwa | |
| 5,760,846 A | 6/1998 | Lee | |
| 5,793,527 A | 8/1998 | Nalwa | |
| 5,903,306 A | 5/1999 | Heckendorn et al. | |
| 5,926,411 A | 7/1999 | Russell | |
| 5,990,934 A | 11/1999 | Nalwa | |
| 6,111,702 A | 8/2000 | Nalwa | |
| 6,115,176 A | 9/2000 | Nalwa | |
| 6,128,143 A | 10/2000 | Nalwa | |
| 6,141,034 A | 10/2000 | McCutchen | |
| 6,141,145 A | 10/2000 | Nalwa | |
| 6,144,501 A | 11/2000 | Nalwa | |
| 6,195,204 B1 | 2/2001 | Nalwa | |
| 6,219,090 B1 | 4/2001 | Nalwa | |
| 6,285,365 B1 | 9/2001 | Nalwa | |
| 6,356,397 B1 | 3/2002 | Nalwa | |
| 6,421,185 B1 | 7/2002 | Wick et al. | |
| 6,611,289 B1 | 8/2003 | Yu et al. | |
| 6,628,897 B2 | 9/2003 | Suzuki | |
| 6,650,774 B1 | 11/2003 | Szeliski | |
| 6,700,711 B2 | 3/2004 | Nalwa | |
| 6,701,081 B1 | 3/2004 | Dwyer et al. | |
| 6,768,509 B1 | 7/2004 | Bradski et al. | |
| 6,775,437 B2 | 8/2004 | Kazarinov et al. | |
| 6,782,137 B1 | 8/2004 | Avinash | |
| 6,798,406 B1 | 9/2004 | Jones et al. | |
| 6,809,887 B1 | 10/2004 | Gao et al. | |
| 6,850,279 B1 | 2/2005 | Scherling | |
| 6,855,111 B2 | 2/2005 | Yokoi et al. | |
| 6,861,633 B2 | 3/2005 | Osborn | |
| 6,862,364 B1 | 3/2005 | Berestov | |
| 6,992,700 B1 | 1/2006 | Sato et al. | |
| 7,006,123 B2 | 2/2006 | Yoshikawa et al. | |
| 7,039,292 B1 | 5/2006 | Breiholz | |
| 7,084,904 B2 | 8/2006 | Liu et al. | |
| 7,116,351 B2 | 10/2006 | Yoshikawa | |
| 7,215,479 B1 | 5/2007 | Bakin | |
| 7,253,394 B2 | 8/2007 | Kang | |
| 7,271,803 B2 | 9/2007 | Ejiri et al. | |
| 7,336,299 B2 | 2/2008 | Kostrzewski et al. | |
| 7,612,953 B2 | 11/2009 | Nagai et al. | |
| 7,710,463 B2 | 5/2010 | Foote | |
| 7,805,071 B2 | 9/2010 | Mitani | |
| 7,817,354 B2 | 10/2010 | Wilson | |
| 7,893,957 B2 | 2/2011 | Peters et al. | |
| 7,961,398 B2 | 6/2011 | Tocci | |
| 7,978,222 B2 | 7/2011 | Schneider | |
| 8,004,557 B2 | 8/2011 | Pan | |
| 8,098,276 B2 | 1/2012 | Chang et al. | |
| 8,115,813 B2 * | 2/2012 | Tang .................... | G03B 19/07 348/159 |
| 8,139,125 B2 | 3/2012 | Scherling | |
| 8,228,417 B1 | 7/2012 | Georgiev et al. | |
| 8,267,601 B2 | 9/2012 | Campbell et al. | |
| 8,284,263 B2 | 10/2012 | Oohara et al. | |
| 8,294,073 B1 | 10/2012 | Vance et al. | |
| 8,356,035 B1 | 1/2013 | Baluja et al. | |
| 8,400,555 B1 | 3/2013 | Georgiev et al. | |
| 8,442,392 B2 | 5/2013 | Ollila et al. | |
| 8,482,813 B2 | 7/2013 | Kawano et al. | |
| 8,791,984 B2 | 7/2014 | Jones et al. | |
| 8,836,693 B2 | 9/2014 | Katano | |
| 8,928,988 B1 | 1/2015 | Ford et al. | |
| 8,988,564 B2 | 3/2015 | Webster et al. | |
| 9,049,375 B2 | 6/2015 | Wade et al. | |
| 9,055,208 B2 | 6/2015 | Kim | |
| 9,185,296 B2 | 11/2015 | Wade et al. | |
| 9,264,610 B2 | 2/2016 | Duparre | |
| 9,294,672 B2 | 3/2016 | Georgiev et al. | |
| 9,316,810 B2 | 4/2016 | Mercado | |
| 9,332,188 B2 | 5/2016 | Takei et al. | |
| 9,386,222 B2 | 7/2016 | Georgiev et al. | |
| 9,398,264 B2 * | 7/2016 | Georgiev ............. | G06T 3/4038 |
| 9,541,740 B2 | 1/2017 | Georgiev | |
| 9,549,107 B2 | 1/2017 | Georgiev et al. | |
| 9,609,210 B2 | 3/2017 | Djordjevic et al. | |
| 2001/0028482 A1 | 10/2001 | Nishioka | |
| 2002/0070365 A1 | 6/2002 | Karellas | |
| 2002/0136150 A1 * | 9/2002 | Mihara ............. | H04N 13/0217 369/125 |
| 2003/0024987 A1 | 2/2003 | Zhu | |
| 2003/0034395 A1 | 2/2003 | Tsikos et al. | |
| 2003/0038814 A1 | 2/2003 | Blume | |
| 2003/0214575 A1 | 11/2003 | Yoshikawa | |
| 2004/0021767 A1 | 2/2004 | Endo et al. | |
| 2004/0051805 A1 | 3/2004 | Yoshikawa et al. | |
| 2004/0066449 A1 | 4/2004 | Givon | |
| 2004/0105025 A1 | 6/2004 | Scherling | |
| 2004/0183907 A1 | 9/2004 | Hovanky et al. | |
| 2004/0195492 A1 | 10/2004 | Hsin | |
| 2004/0246333 A1 | 12/2004 | Steuart et al. | |
| 2004/0263611 A1 | 12/2004 | Cutler | |
| 2005/0053274 A1 | 3/2005 | Mayer et al. | |
| 2005/0057659 A1 | 3/2005 | Hasegawa | |
| 2005/0081629 A1 | 4/2005 | Hoshal | |
| 2005/0111106 A1 | 5/2005 | Matsumoto et al. | |
| 2005/0185711 A1 | 8/2005 | Pfister et al. | |
| 2005/0218297 A1 | 10/2005 | Suda et al. | |
| 2006/0023074 A1 | 2/2006 | Cutler | |
| 2006/0023106 A1 | 2/2006 | Yee et al. | |
| 2006/0023278 A1 | 2/2006 | Nishioka | |
| 2006/0061660 A1 | 3/2006 | Brackmann | |
| 2006/0098267 A1 | 5/2006 | Togawa | |
| 2006/0140446 A1 | 6/2006 | Luo et al. | |
| 2006/0193509 A1 | 8/2006 | Criminisi et al. | |
| 2006/0215054 A1 | 9/2006 | Liang et al. | |

(56) References Cited

U.S. PATENT DOCUMENTS

| | | |
|---|---|---|
| 2006/0215903 A1 | 9/2006 | Nishiyama |
| 2006/0238441 A1 | 10/2006 | Benjamin et al. |
| 2007/0024739 A1 | 2/2007 | Konno |
| 2007/0058961 A1 | 3/2007 | Kobayashi et al. |
| 2007/0064142 A1 | 3/2007 | Misawa et al. |
| 2007/0085903 A1 | 4/2007 | Zhang |
| 2007/0146530 A1 | 6/2007 | Nose |
| 2007/0164202 A1 | 7/2007 | Wurz et al. |
| 2007/0216796 A1 | 9/2007 | Lenel et al. |
| 2007/0242152 A1 | 10/2007 | Chen |
| 2007/0263115 A1 | 11/2007 | Horidan et al. |
| 2007/0268983 A1 | 11/2007 | Elam |
| 2008/0029708 A1 | 2/2008 | Olsen et al. |
| 2008/0030597 A1 | 2/2008 | Olsen et al. |
| 2008/0058629 A1 | 3/2008 | Seibel et al. |
| 2008/0088702 A1 | 4/2008 | Linsenmaier et al. |
| 2008/0117289 A1 | 5/2008 | Schowengerdt et al. |
| 2008/0117532 A1 | 5/2008 | Shafer |
| 2008/0218612 A1 | 9/2008 | Border et al. |
| 2008/0259172 A1 | 10/2008 | Tamaru |
| 2008/0266404 A1 | 10/2008 | Sato |
| 2008/0290435 A1 | 11/2008 | Oliver et al. |
| 2008/0291543 A1 | 11/2008 | Nomura et al. |
| 2008/0297612 A1 | 12/2008 | Yoshikawa |
| 2008/0316301 A1 | 12/2008 | Givon |
| 2009/0003646 A1 | 1/2009 | Au et al. |
| 2009/0005112 A1 | 1/2009 | Sorek et al. |
| 2009/0015812 A1 | 1/2009 | Schultz et al. |
| 2009/0051804 A1 | 2/2009 | Nomura et al. |
| 2009/0080695 A1 | 3/2009 | Yang |
| 2009/0085846 A1 | 4/2009 | Cho et al. |
| 2009/0096994 A1 | 4/2009 | Smits |
| 2009/0153726 A1 | 6/2009 | Lim |
| 2009/0160931 A1 | 6/2009 | Pockett et al. |
| 2009/0219402 A1 | 9/2009 | Schneider |
| 2009/0268983 A1 | 10/2009 | Stone et al. |
| 2009/0268985 A1 | 10/2009 | Wong et al. |
| 2009/0296984 A1 | 12/2009 | Nijim et al. |
| 2009/0315808 A1 | 12/2009 | Ishii |
| 2010/0044555 A1 | 2/2010 | Ohara et al. |
| 2010/0045774 A1 | 2/2010 | Len et al. |
| 2010/0066812 A1 | 3/2010 | Kajihara et al. |
| 2010/0165155 A1 | 7/2010 | Chang |
| 2010/0202766 A1 | 8/2010 | Takizawa et al. |
| 2010/0215249 A1 | 8/2010 | Heitz et al. |
| 2010/0232681 A1 | 9/2010 | Fujieda et al. |
| 2010/0259655 A1 | 10/2010 | Takayama |
| 2010/0265313 A1 | 10/2010 | Liu et al. |
| 2010/0265363 A1 | 10/2010 | Kim |
| 2010/0278423 A1 | 11/2010 | Itoh et al. |
| 2010/0289878 A1 | 11/2010 | Sato et al. |
| 2010/0290703 A1 | 11/2010 | Sim et al. |
| 2010/0290769 A1 | 11/2010 | Nasiri et al. |
| 2010/0302396 A1 | 12/2010 | Golub et al. |
| 2010/0309286 A1 | 12/2010 | Chen et al. |
| 2010/0309333 A1 | 12/2010 | Smith et al. |
| 2011/0001789 A1 | 1/2011 | Wilson et al. |
| 2011/0007135 A1 | 1/2011 | Okada et al. |
| 2011/0009163 A1 | 1/2011 | Fletcher et al. |
| 2011/0012998 A1 | 1/2011 | Pan |
| 2011/0043623 A1 | 2/2011 | Fukuta et al. |
| 2011/0090575 A1 | 4/2011 | Mori |
| 2011/0096089 A1 | 4/2011 | Shenhav et al. |
| 2011/0096988 A1 | 4/2011 | Suen et al. |
| 2011/0128412 A1 | 6/2011 | Milnes et al. |
| 2011/0150442 A1 | 6/2011 | Ollila et al. |
| 2011/0181588 A1 | 7/2011 | Barenbrug et al. |
| 2011/0213664 A1 | 9/2011 | Osterhout et al. |
| 2011/0235899 A1 | 9/2011 | Tanaka |
| 2011/0249341 A1 | 10/2011 | Difrancesco et al. |
| 2011/0262122 A1 | 10/2011 | Minamisawa et al. |
| 2011/0304764 A1 | 12/2011 | Shigemitsu et al. |
| 2012/0008148 A1 | 1/2012 | Pryce et al. |
| 2012/0033051 A1 | 2/2012 | Atanassov et al. |
| 2012/0044368 A1 | 2/2012 | Lin et al. |
| 2012/0056987 A1 | 3/2012 | Fedoroff |
| 2012/0075168 A1 | 3/2012 | Osterhout et al. |
| 2012/0229688 A1 | 9/2012 | Tajiri |
| 2012/0249750 A1 | 10/2012 | Izzat et al. |
| 2012/0249815 A1 | 10/2012 | Bohn et al. |
| 2012/0269400 A1 | 10/2012 | Heyward |
| 2012/0281072 A1 | 11/2012 | Georgiev et al. |
| 2012/0293607 A1 | 11/2012 | Bhogal et al. |
| 2012/0293632 A1 | 11/2012 | Yukich |
| 2012/0327195 A1 | 12/2012 | Cheng |
| 2013/0003140 A1 | 1/2013 | Keniston et al. |
| 2013/0010084 A1 | 1/2013 | Hatano |
| 2013/0038689 A1 | 2/2013 | McDowall |
| 2013/0070055 A1 | 3/2013 | Atanassov et al. |
| 2013/0076924 A1 | 3/2013 | Wade et al. |
| 2013/0077945 A1 | 3/2013 | Liu et al. |
| 2013/0100304 A1 | 4/2013 | Wade et al. |
| 2013/0128030 A1 | 5/2013 | Georgiev |
| 2013/0141802 A1 | 6/2013 | Yang |
| 2013/0182325 A1 | 7/2013 | Minamisawa et al. |
| 2013/0222556 A1 | 8/2013 | Shimada |
| 2013/0229529 A1 | 9/2013 | Lablans |
| 2013/0250045 A1 | 9/2013 | Ki et al. |
| 2013/0250053 A1 | 9/2013 | Levy |
| 2013/0250123 A1 | 9/2013 | Zhang et al. |
| 2013/0260823 A1 | 10/2013 | Shukla et al. |
| 2013/0278785 A1 | 10/2013 | Nomura et al. |
| 2013/0286451 A1 | 10/2013 | Verhaegh |
| 2013/0335598 A1 | 12/2013 | Gustavsson et al. |
| 2013/0335600 A1 | 12/2013 | Gustavsson et al. |
| 2014/0009631 A1 | 1/2014 | Topliss |
| 2014/0016832 A1 | 1/2014 | Kong et al. |
| 2014/0085502 A1 | 3/2014 | Lin et al. |
| 2014/0104378 A1 | 4/2014 | Kauff et al. |
| 2014/0111650 A1 | 4/2014 | Georgiev et al. |
| 2014/0139623 A1 | 5/2014 | Mccain et al. |
| 2014/0139693 A1 | 5/2014 | Takei et al. |
| 2014/0152852 A1 | 6/2014 | Ito et al. |
| 2014/0184749 A1 | 7/2014 | Hilliges et al. |
| 2014/0192253 A1 | 7/2014 | Laroia |
| 2014/0285673 A1 | 9/2014 | Hundley et al. |
| 2015/0043076 A1 | 2/2015 | Nakayama |
| 2015/0049172 A1 | 2/2015 | Ramachandra et al. |
| 2015/0070562 A1 | 3/2015 | Nayar et al. |
| 2015/0085363 A1 | 3/2015 | Liu et al. |
| 2015/0125092 A1 | 5/2015 | Zhuo et al. |
| 2015/0177524 A1 | 6/2015 | Webster et al. |
| 2015/0201128 A1 | 7/2015 | Dong |
| 2015/0244934 A1 | 8/2015 | Duparre et al. |
| 2015/0253647 A1 | 9/2015 | Mercado |
| 2015/0286033 A1 | 10/2015 | Osborne |
| 2015/0288865 A1 | 10/2015 | Osborne |
| 2015/0371387 A1 | 12/2015 | Atanassov et al. |
| 2015/0373268 A1 | 12/2015 | Osborne |
| 2015/0373269 A1 | 12/2015 | Osborne |
| 2015/0373279 A1 | 12/2015 | Osborne |
| 2016/0014332 A1 | 1/2016 | De Leon et al. |
| 2016/0085059 A1 | 3/2016 | Mercado |
| 2016/0127641 A1 | 5/2016 | Gove |
| 2016/0127646 A1 | 5/2016 | Osborne |
| 2016/0198087 A1 | 7/2016 | Georgiev et al. |
| 2016/0269602 A1 | 9/2016 | Osborne |
| 2016/0286121 A1 | 9/2016 | Georgiev et al. |
| 2016/0353008 A1 | 12/2016 | Osborne |
| 2017/0026570 A1 | 1/2017 | Shepard et al. |
| 2017/0038502 A1 | 2/2017 | Georgiev |
| 2017/0118421 A1 | 4/2017 | Georgiev |

FOREIGN PATENT DOCUMENTS

| | | |
|---|---|---|
| CN | 101581828 A | 11/2009 |
| CN | 101867720 A | 10/2010 |
| CN | 101902657 A | 12/2010 |
| CN | 202405984 U | 8/2012 |
| EP | 0610605 A1 | 8/1994 |
| EP | 0751416 A1 | 1/1997 |
| EP | 1176812 A1 | 1/2002 |
| EP | 1383342 A2 | 1/2004 |
| EP | 1816514 A1 | 8/2007 |

(56) References Cited

FOREIGN PATENT DOCUMENTS

| | | |
|---|---|---|
| EP | 1832912 A2 | 9/2007 |
| EP | 2242252 A2 | 10/2010 |
| GB | 2354390 A | 3/2001 |
| GB | 2354391 A | 3/2001 |
| JP | H06251127 A | 9/1994 |
| JP | H089424 A | 1/1996 |
| JP | H0847001 A | 2/1996 |
| JP | H08125835 A | 5/1996 |
| JP | 8194274 A | 7/1996 |
| JP | H08242453 A | 9/1996 |
| JP | H10142490 A | 5/1998 |
| JP | 2001194114 A | 7/2001 |
| JP | 2003304561 A | 10/2003 |
| JP | 3791847 B1 | 6/2006 |
| JP | 2006279538 A | 10/2006 |
| JP | 2007147457 A | 6/2007 |
| JP | 2007323615 A | 12/2007 |
| JP | 2008009424 A | 1/2008 |
| JP | 2009122842 A | 6/2009 |
| JP | 2010041381 A | 2/2010 |
| JP | 2010067014 A | 3/2010 |
| JP | 2010128820 A | 6/2010 |
| JP | 2010524279 A | 7/2010 |
| KR | 20080071400 A | 8/2008 |
| WO | WO-9321560 A1 | 10/1993 |
| WO | WO-9847291 A2 | 10/1998 |
| WO | WO-2006075528 A1 | 7/2006 |
| WO | WO-2007129147 A1 | 11/2007 |
| WO | WO-2008112054 A1 | 9/2008 |
| WO | WO-2009047681 A1 | 4/2009 |
| WO | WO-2009086330 A2 | 7/2009 |
| WO | WO-2010019757 A1 | 2/2010 |
| WO | WO-2012136388 A1 | 10/2012 |
| WO | WO-2012164339 A1 | 12/2012 |
| WO | WO-2013154433 A1 | 10/2013 |
| WO | WO-2014012603 A1 | 1/2014 |
| WO | WO-2014025588 A1 | 2/2014 |

OTHER PUBLICATIONS

Han Y., et al., "Removing Illumination for Image Pair for Stereo Matching", Audio Language and Image Processing (ICALIP), 2012 International Conference On, IEEE, Jul. 16, 2012, XP032278010, pp. 508-512.

Hao M., et al., "Object Location Technique for Binocular Stereo Vision Based on Scale Invariant Feature Transform Feature Points", SIFT, Journal of Harbin Engineering University, Jun. 2009, vol. 30, No. 6 pp. 649-653.

Hoff, et al., "Surfaces from Stereo: Integrating Feature Matching, Disparity Estimation, and Contour Detection", IEEE Transactions on Pattern Analysis and Machine Intelligence, vol. 11, No. 2, pp. 121-136, Feb. 1989.

International Search Report and Written Opinion—PCT/US2013/064381—ISA/EPO—Mar. 21, 2014.

Kawanishi T., et al., "Generation of High-Resolution Stereo Panoramic Images by Omnidirectional Imaging Sensor Using Hexagonal Pyramidal Mirrors", Pattern Recognition, 1998, Proceedings, Fourteenth International Conference on Brisbane, QLD., Australia Aug. 16-20, 1998, Los Alamitos, CA, USA,IEEE Comput. Soc, US, Jan. 1, 1998 (Jan. 1, 1998), pp. 485-489, vol. 1, XP031098377, ISBN: 978-0-8186-8512-5.

Krotkov E., et al., "Active vision for reliable ranging: Cooperating focus, stereo, and vergence", International Journal of Computer Vision. vol. 11, No. 2, Oct. 1, 1993 (Oct. 1, 1993), pp. 187-203, XP055149875, ISSN: 0920-5691. DOI: 10.1007/BF01469228.

Murphy M., et al., "Lens Drivers Focus on Performance in High-Resolution Camera Modules," Analog Dialogue, Nov. 2006, vol. 40, pp. 1-3.

Narkhede, et al., "Stereoscopic Imaging: A Real-Time, In Depth Look," IEEE Potentials, Feb./Mar. 2004, vol. 23, Issue 1, pp. 38-42.

RICOH Imagine Change: "New RICOH THETA Model, Capturing 360-degree Images in One Shot, is on Sale Soon—Spherical Video Function, API and SDK (Beta Version)", News Release, Oct. 28, 2014, 3 pages.

Shuchun Y., et al., "Preprocessing for stereo vision based on LOG filter", Proceedings of 2011 6th International Forum on Strategic Technology, Aug. 2011, XP055211077, pp. 1074-1077.

Sun W.S., et al., "Single-Lens Camera Based on a Pyramid Prism Array to Capture Four Images," Optical Review, 2013, vol. 20 (2), pp. 145-152.

Tan K-H., et al., "Multiview Panoramic Cameras Using a Pyramid", Omnidirectional Vision, 2002, Proceedings, Third Workshop on Jun. 2, 2002, Piscataway, NJ, USA,IEEE, Jan. 1, 2002 (Jan. 1, 2002), pp. 87-93, XP010611080, ISBN: 978-0-7695-1629-5.

Hua et al., "Design Analysis of a High-Resolution Panoramic Camera Using Conventional Imagers and a Mirror Pyramid," IEEE Transactions on Pattern Analysis and Machine Intelligence; Feb. 2007; 29(2): 356-361.

Meng et al., "Single-shot Specular Surface Reconstruction with Gonio-plenoptic Imaging," 2015 IEEE International Conference on Computer Vision; pp. 3433-3441.

Chowdhury A., et al., "Challenges of Megapixel Camera Module Assembly and Test," Electronic Components and Technology Conference, 2005, pp. 1390-1401.

* cited by examiner

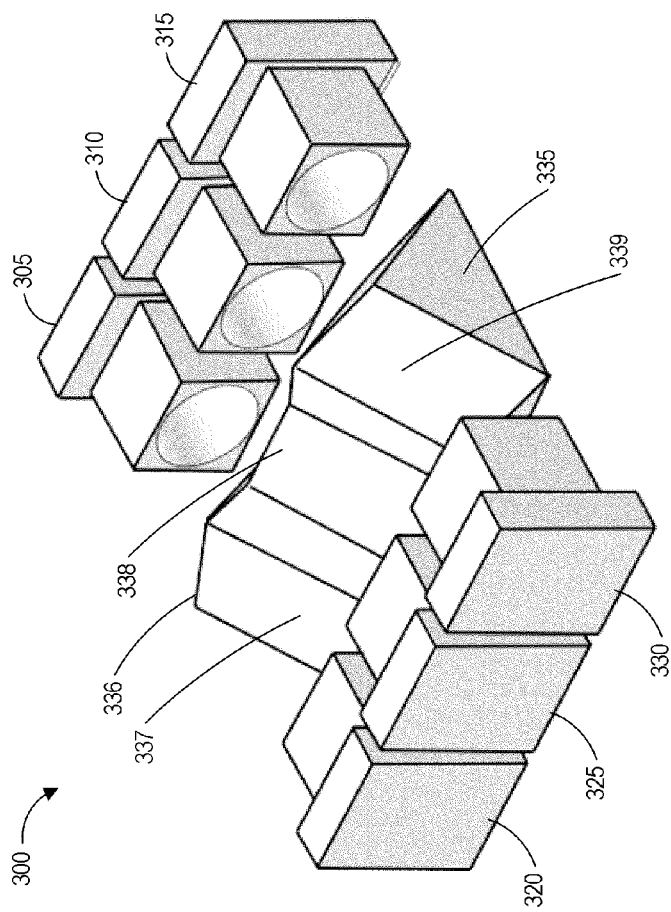

MULTI-CAMERA SYSTEM USING FOLDED OPTICS

CROSS-REFERENCE TO RELATED APPLICATIONS

The present application is a continuation of U.S. patent application Ser. No. 13/837,098 filed Mar. 15, 2013, entitled "MULTI-CAMERA SYSTEM USING FOLDED OPTICS", which claims the benefit of U.S. Patent Application No. 61/716,339 filed Oct. 19, 2012, entitled "MULTI-CAMERA SYSTEM USING FOLDED OPTICS" and assigned to the assignee hereof. The disclosure of this prior application is considered part of, and is incorporated by reference in, this disclosure.

TECHNICAL FIELD

The present disclosure relates to imaging systems and methods that include a multi-camera array. In particular, the disclosure relates to systems and methods that enable low-profile imaging systems and mobile devices while maintaining or improving image quality.

BACKGROUND

Many mobile devices, such as mobile phones and tablet computing devices, include cameras that may be operated by a user to capture still and/or video images. Because the mobile devices are typically designed to be relatively small, it can be important to design the cameras or imaging systems to be as thin as possible in order to maintain a low-profile mobile device. In various conventional devices, the thickness of the mobile device is maintained as small as possible by turning the imaging sensor on its side and using reflective devices to bend the rays to the sensor. However, this particular solution is not very robust because the width of the imaging sensor and the pixel pitch may determine the highest resolution of the camera.

In other conventional devices, the thickness of the mobile device is maintained as small as possible by shortening the focal length of the imaging system. However, various problems can arise when the focal length of the system is designed to be as short as possible. For example, because the focal length and the field of view of the system are inversely related, shortening the focal length may increase the field of view to such an extent that the image may cross over from a natural image to an unnatural wide field of view image, e.g., at fields of view of about 60 degrees or greater. Furthermore, lens roll-off, e.g., the loss of light or brightness near the edges of an image as compared with the center of an image, may increase as focal length decreases. Thus, as the focal length of imaging systems in mobile devices is reduced, image quality may degrade due to undesirable lens roll-off.

In addition, the modulation transfer function (MTF) of imaging systems in various mobile devices may produce lower resolution near the edges of the image as compared to the center of the image, which may be referred to as MTF roll-off. Because MTF roll-off may also be inversely related to focal length, a reduced focal length in mobile devices may reduce the resolution at the edges of the image. Moreover, shorter focal lengths may increase the angle of incidence of the lens' chief ray, which can also generate undesirable artifacts, including increased light and electrical crosstalk between pixels and a lower sensor MTF performance.

Accordingly, it can be advantageous to reduce the thickness of imaging systems in mobile devices, while maintaining or improving image quality.

SUMMARY

The folded optic sensor arrays and image capture techniques described herein allow for the creation of low-profile image capture devices without shortening the focal length or decreasing the resolution of the image across the sensor array's field of view. By redirecting light toward each sensor in the array using a primary and secondary surface, and by positioning the lens assemblies used to focus the incoming light between the primary and secondary surfaces, the sensor array may be positioned on a flat substrate perpendicular to the lens assemblies. The longer focal length makes it possible to implement features such as optical zoom and to incorporate more complicated optics that require more space than commonly afforded by the traditional mobile camera, such as adding more optical elements. Camera acuity, which refers to the camera's angular resolution and it defines how well the camera resolves far away objects, is proportional to focal length and thus directly benefits from longer cameras.

Some of the embodiments may employ a central mirror, for example with multiple surfaces, to split incoming light comprising the target image into multiple portions for capture by the sensors in the array. Other embodiments may employ a prism with multiple facets, wherein each facet directs a portion of the light comprising the target image toward a sensor in the array. Each portion of the split light may be passed through a lens assembly and reflected off of a surface positioned directly above or below a sensor, such that each sensor captures a portion of the image. In some circumstances, each sensor in the array may capture a portion of the image which overlaps slightly with the portions captured by neighboring sensors in the array, and these portions may be assembled into the target image, for example by image stitching techniques.

According to one embodiment, an image capture system comprises a plurality of image sensors, each of the plurality of image sensors having one of a plurality of fields of view, each of the plurality of fields of view comprising a substantially different portion of the scene; a plurality of lens assemblies, each lens assembly corresponding to one of the plurality of image sensors; a primary surface positioned so as to direct light comprising at least a portion of the scene through at least one of the plurality of lens assemblies; a plurality of secondary surfaces, wherein each of the secondary surfaces directs at least a portion of the light from one of the plurality of lens assemblies into one of the plurality of image sensors, and wherein each of the plurality of image sensors captures one of a plurality of partial images, each of the plurality of partial images corresponding to one of the plurality of fields of view; and a processing module configured to assemble the plurality of partial images into the target image.

The image capture system may further comprise a substantially flat substrate. The plurality of image sensors, plurality of lens assemblies, primary surface and secondary surfaces may be mounted on the substrate in a variety of suitable configurations. The primary surface may comprise one or more reflective surface, and in some embodiments may be a prism comprising one or more facets configured to redirect incoming light comprising the target image scene.

According to another embodiment, a method is provided for capturing a target image scene, the method comprising the steps of providing plurality of image sensors, each of the plurality of image sensors having one of a plurality of fields of view, each of the plurality of fields of view comprising a substantially different portion of the scene; providing a plurality of lens assemblies, each lens assembly corresponding to one of the plurality of image sensors; directing light comprising at least a portion of the scene toward each of the plurality of lens assemblies using at least one primary surface; directing the light from each of the plurality of lens assemblies toward a corresponding one of the plurality of image sensors using a plurality of secondary surfaces; capturing a plurality of partial images, wherein each of the plurality of partial images is captured by one of the plurality of image sensors and corresponds to one of the plurality of fields of view; and assembling the plurality of partial images into the target image.

BRIEF DESCRIPTION OF THE DRAWINGS

Various aspects of image capture are illustrated by way of example, and not by way of limitation, in the accompanying drawings, wherein:

FIG. 3B illustrates perspective view of an embodiment of the folded optic sensor array of FIG. 3A;

DETAILED DESCRIPTION

Figure 1A:
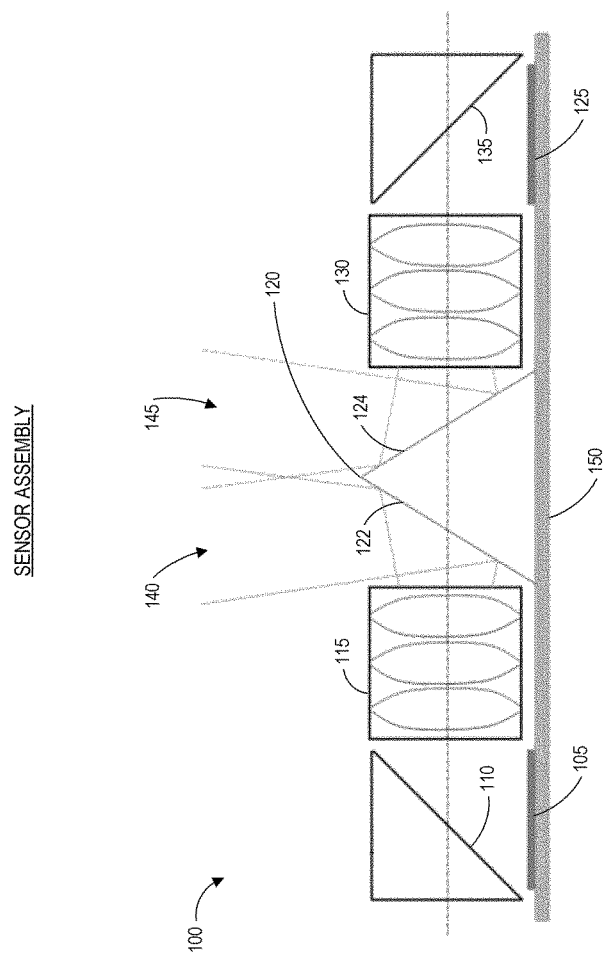
FIG. 1A illustrates a cross-sectional side view of an embodiment of a folded optic sensor assembly.

Implementations disclosed herein provide systems, methods and apparatus for mobile imaging applications. For example, as explained herein, it can be desirable to reduce the form factor of mobile devices while maintaining or improving image quality. The implementations disclosed herein can be used in mobile devices to reduce the thickness of imaging systems by employing multiple imaging sensors and/or multiple lenses across the field of view of the imaging system. In various implementations, an array of cameras and/or imaging sensors may be provided adjacent one or more reflective surfaces. The array of sensors can capture multiple, overlapping images, which can be stitched together to form a single image while maintaining high image quality and resolution. By spacing multiple sensors laterally on a substrate, or otherwise adjacent one another in the system, the overall height or thickness of the imaging system can be reduced. In various implementations, the disclosed systems may be so-called folded optical systems that include relatively long optical path lengths. By not reducing the focal length in a substantial way, the reductions in image quality described above can be avoided, while still maintaining an imaging system with a reduced height.

It should be appreciated that many other implementations of the disclosed concepts are possible. Various advantages can be achieved with the disclosed implementations. For example, the overall thickness of the mobile device, including the imaging system, can be reduced compared with conventional imaging systems used in mobile devices. Further, the resolution of the image across the sensor array's field of view can be improved and can avoid the roll-off in resolution found in traditional cameras (e.g., where resolution may decrease at the edges). Further, the use of multiple lenses across the field of view of the system can increase the total effective resolution across the entire field of view. In addition, the use of multiple lenses may increase the focal length of the camera and thus increase the camera's acuity.

In various arrangements, the field of view of each camera may overlap to achieve specific purposes, such as enabling the ability to adjust the focus after post-processing. Furthermore, high dynamic range cameras can be implemented to capture two simultaneous images and then merge them together. In addition, an autofocus application can be implemented by changing the focal length between the lens and the sensor of each camera in the array. As explained herein, various other advantages and implementations can be achieved.

One skilled in the art will recognize that these embodiments may be implemented in hardware, software, firmware, or any combination thereof. Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

In the following description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be rearranged. A process is terminated when its operations are completed. A process may correspond to a method, a function, a procedure, a subroutine, a subprogram, etc. When a process corresponds to a software function, its termination corresponds to a return of the function to the calling function or the main function.

Figure 1B:
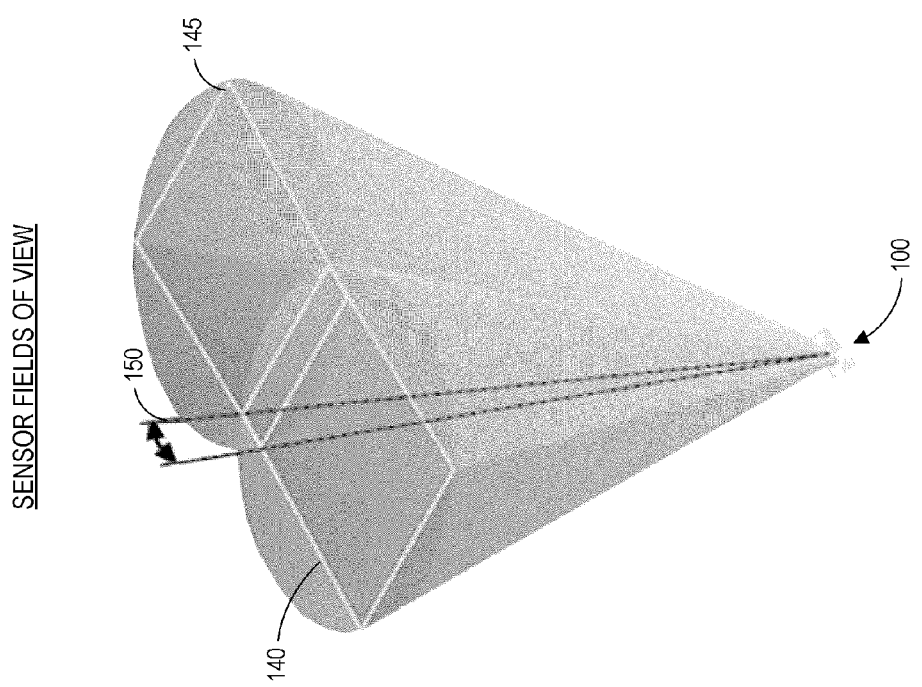
FIG. 1B illustrates an top view of an embodiment of projected fields of view of the folded optic sensor assembly of FIG. 1A.

Referring now to FIGS. 1A-B, an exemplary folded optics multi-sensor assembly 100 will now be described in greater detail. As show in FIG. 1A, a sensor assembly 100 may include image sensors 105, 125, reflective surfaces 110, 135, lens assemblies 115, 130, a central reflective surface 120 all mounted to a substrate 150.

The image sensors 105, 125 may comprise, in certain embodiments, a charge-coupled device (CCD), complementary metal oxide semiconductor sensor (CMOS), or any other image sensing device that receives light and generates image data in response to the received image. Image sensors 105, 125 may be able to obtain image data of still photographs and may also provide information regarding motion in a captured video stream. Sensors 105 and 125 may be individual sensors or may represent arrays of sensors, such as a 3×1 array. However, as will be understood by one skilled in the art, any suitable array of sensors may be used in the disclosed implementations.

The sensors 105, 125 may be mounted on the substrate 150 as shown in FIG. 1A. In some embodiments, all sensors may be on one plane by being mounted to the flat substrate 150. Substrate 150 may be any suitable substantially flat material. The central reflective surface 120 and lens assemblies 115, 130 may be mounted on the substrate 150 as well. Multiple configurations are possible for mounting a sensor array or arrays, a plurality of lens assemblies, and a plurality of primary and secondary reflective or refractive surfaces.

In some embodiments, a central reflective surface 120 may be used to redirect light from a target image scene toward the sensors 105, 125. Central reflective surface 120 may be a mirror or a plurality of mirrors, and may be flat or shaped as needed to properly redirect incoming light to the image sensors 105, 125. For example, in some embodiments, central reflective surface 120 may be a mirror sized and shaped to reflect incoming light rays through the lens assemblies 115, 130 to sensors 105, 125. The central reflective surface 120 may split light comprising the target image into multiple portions and direct each portion at a different sensor. For example, a first side 122 of the central reflective surface 120 may send a portion of the light corresponding to a first field of view 140 toward the left sensor 105 while a second side 124 sends a second portion of the light corresponding to a second field of view 145 toward the right sensor 125. It should be appreciated that together the fields of view 140, 145 of the image sensors cover at least the target image.

In some embodiments in which the receiving sensors are each an array of a plurality of sensors, the central reflective surface may be made of multiple reflective surfaces angled relative to one another in order to send a different portion of the target image scene toward each of the sensors. Each sensor in the array may have a substantially different field of view, and in some embodiments the fields of view may overlap. Certain embodiments of the central reflective surface may have complicated non-planar surfaces to increase the degrees of freedom when designing the lens system. Further, although the central surface is discussed as being a reflective surface, in other embodiments central surface may be refractive. For example, central surface may be a prism configured with a plurality of facets, where each facet directs a portion of the light comprising the scene toward one of the sensors.

After being reflected off the central reflective surface 120, the light may be passed through lens assemblies 115, 130. One or more lens assemblies 115, 130 may be provided between the central reflective surface 120 and the sensors 105, 125 and reflective surfaces 110, 135. The lens assemblies 115, 130 may be used to focus the portion of the target image which is directed toward each sensor.

In some embodiments, each lens assembly may comprise one or more lenses and an actuator for moving the lens among a plurality of different lens positions through a housing. The actuator may be a voice coil motor (VCM), micro-electronic mechanical system (MEMS), or a shape memory alloy (SMA). The lens assembly may further comprise a lens driver for controlling the actuator.

Traditional auto focus techniques may be implemented by changing the focal length between the lens 115, 130 and corresponding sensor 105, 125 of each sensor assembly. In some embodiments, this may be accomplished by moving a lens barrel. Other embodiments may adjust the focus by moving the central mirror up or down or by adjusting the angle of the mirror relative to the lens assembly. Certain embodiments may adjust the focus by moving the side mirrors over each sensor. Such embodiments may allow the assembly to adjust the focus of each sensor individually. Further, it is possible for some embodiments to change the focus of the entire assembly at once, for example by placing a lens like a liquid lens over the entire assembly. In certain implementations, computational photography may be used to change the focal point of the camera array.

Multiple side reflective surfaces, such as reflective surfaces 110 and 135, can be provided around the central mirror 120 opposite the sensors. After passing through the lens assemblies, the side reflective surfaces 110, 135 can reflect the light downward onto the flat sensors 105, 125. As depicted, sensor 105 may be positioned beneath reflective surface 110 and sensor 125 may be positioned beneath reflective surface 135. However, in other embodiments, the sensors may be above the side reflected surfaces, and the side reflective surfaces may be configured to reflect light upward. Other suitable configurations of the side reflective surfaces and the sensors are possible in which the light from each lens assembly is redirected toward the sensors. Certain embodiments may enable movement of the side reflective surfaces 110, 135 to change the focus or field of view of the associated sensor.

As shown in FIG. 1B, each sensor's field of view 140, 145 may be steered into the object space by the surface of the central mirror 120 associated with that sensor. Mechanical methods may be employed to tilt the mirrors and/or move the prisms in the array so that the field of view of each camera can be steered to different locations on the object field. This may be used, for example, to implement a high dynamic range camera, to increase the resolution of the camera system, or to implement a plenoptics camera system. Each sensor's (or each 3×1 array's) field of view may be projected into the object space, and each sensor may capture a partial image comprising a portion of the target scene according to that sensor's field of view. In some embodiments, the fields of view 140, 145 for the opposing sensor arrays 105, 125 may overlap by a certain amount 150. To reduce the overlap 150 and form a single image, a stitching process as described below may be used to combine the images from the two opposing sensor arrays 105, 125. Certain embodiments of the stitching process may employ the overlap 150 for identifying common features in stitching the partial images together. After stitching the overlapping images together, the stitched image may be cropped to a desired aspect ratio, for example 4:3 or 1:1, to form the final image.

Figure 2:
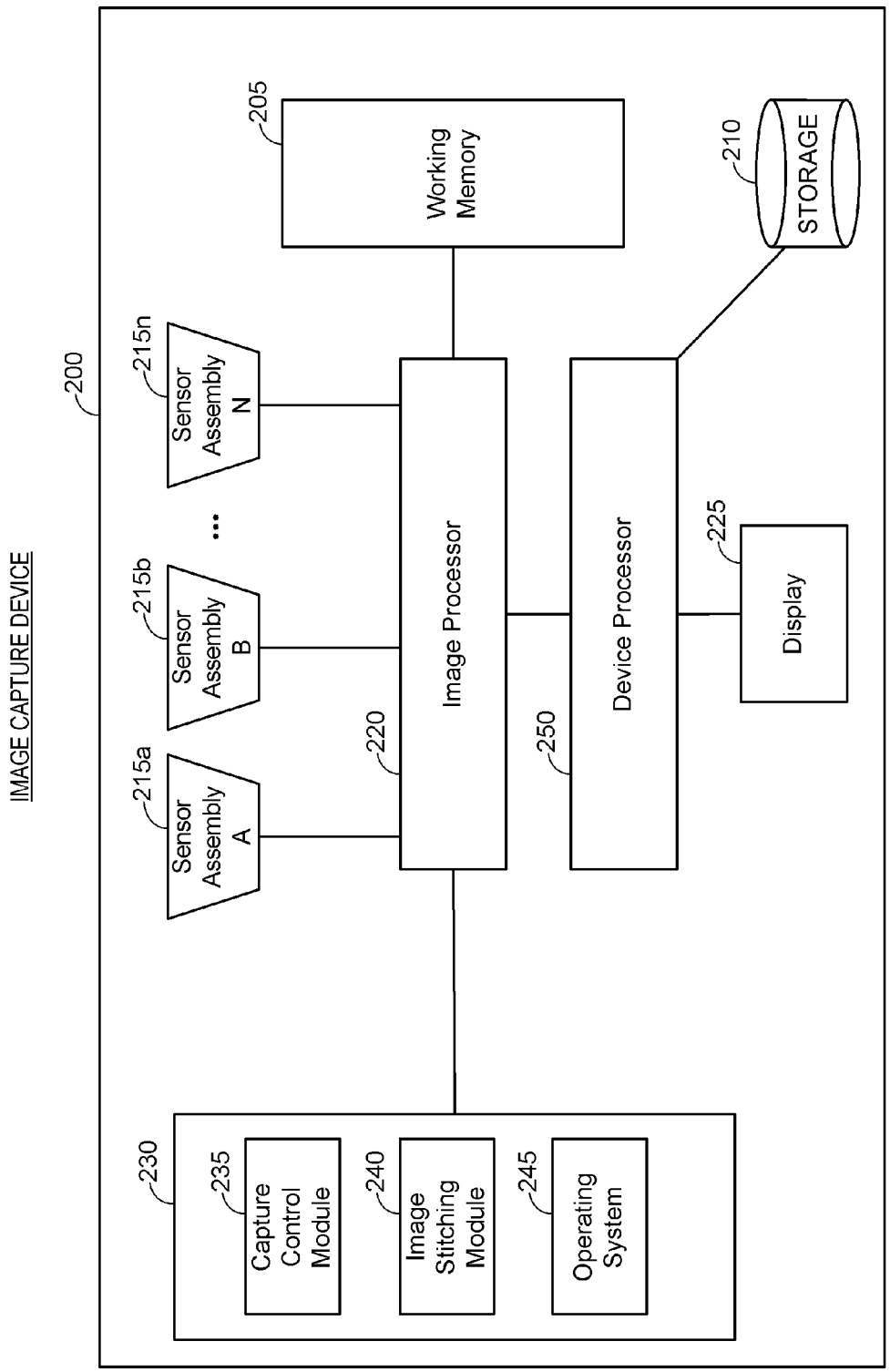
FIG. 2 illustrates a block diagram of one embodiment of an image capture device.

FIG. 2 depicts a high-level block diagram of a device 200 having a set of components including an image processor 220 linked to one or more image sensor assemblies 215a-n. The image processor 220 is also in communication with a working memory 205, memory 230, and device processor 250, which in turn is in communication with storage 210 and electronic display 225.

Device 200 may be a cell phone, digital camera, tablet computer, personal digital assistant, or the like. There are many portable computing devices in which a reduced thickness imaging system such as is described herein would provide advantages. Device 200 may also be a stationary computing device or any device in which a thin imaging system would be advantageous. A plurality of applications may be available to the user on device 200. These applications may include traditional photographic and video applications, high dynamic range imaging, panoramic photo and video, or stereoscopic imaging such as 3D images or 3D video.

The image capture device 200 includes the image sensor assemblies 215a-n for capturing external images. The image sensor assemblies 215a-n may each comprise a sensor, lens assembly, and a primary and secondary reflective or refractive surface for redirecting a portion of a target image to each sensor, as discussed above with respect to FIG. 1A. In general, N image sensor assemblies 215a-n may be used, where N≥2. Thus, the target image may be split into N portions in which each sensor of the N sensor assemblies captures one portion of the target image according to that sensor's field of view. However, some embodiments may employ only one image sensor assembly, and it will be understood that image sensor assemblies 215a-n may comprise any number of image sensor assemblies suitable for an implementation of the folded optic imaging device described herein. The number of sensors may be increased to achieve lower z-heights of the system, as discussed in more detail below with respect to FIG. 4, or to meet the needs of other purposes, such as having overlapping fields of view similar to that of a plenoptics camera, which may enable the ability to adjust the focus of the image after post-processing. Other embodiments may have a field of view overlap configuration suitable for high dynamic range cameras enabling the ability to capture two simultaneous images and then merge them together. The image sensor assemblies 215a-n may be coupled to the camera processor 220 to transmit captured image to the image processor 220.

The image processor 220 may be configured to perform various processing operations on received image data comprising N portions of the target image in order to output a high quality stitched image, as will be described in more detail below. Processor 220 may be a general purpose processing unit or a processor specially designed for imaging applications. Examples of image processing operations include cropping, scaling (e.g., to a different resolution), image stitching, image format conversion, color interpolation, color processing, image filtering (e.g., spatial image filtering), lens artifact or defect correction, etc. Processor 220 may, in some embodiments, comprise a plurality of processors. Certain embodiments may have a processor dedicated to each image sensor. Processor 220 may be one or more dedicated image signal processors (ISPs) or a software implementation of a processor.

As shown, the image processor 220 is connected to a memory 230 and a working memory 205. In the illustrated embodiment, the memory 230 stores capture control module 235, image stitching module 240, and operating system 245. These modules include instructions that configure the image processor 220 of device processor 250 to perform various image processing and device management tasks. Working memory 205 may be used by image processor 220 to store a working set of processor instructions contained in the modules of memory 230. Alternatively, working memory 205 may also be used by image processor 220 to store dynamic data created during the operation of device 200.

As mentioned above, the image processor 220 is configured by several modules stored in the memories. The capture control module 235 may include instructions that configure the image processor 220 to adjust the focus position of imaging sensor assemblies 215a-n. Capture control module 235 may further include instructions that control the overall image capture functions of the device 200. For example, capture control module 235 may include instructions that call subroutines to configure the image processor 220 to capture raw image data of a target image scene using the imaging sensor assemblies 215a-n. Capture control module 235 may then call the image stitching module 240 to perform a stitching technique on the N partial images captured by the sensor assemblies 215a-n and output a stitched and cropped target image to imaging processor 220. Capture control module 235 may also call the image stitching module 240 to perform a stitching operation on raw image data in order to output a preview image of a scene to be captured, and to update the preview image at certain time intervals or when the scene in the raw image data changes.

Image stitching module 240 may comprise instructions that configure the image processor 220 to perform stitching and cropping techniques on captured image data. For example, each of the N sensors 215a-n may capture a partial image comprising a portion of the target image according to each sensor's field of view. The fields of view may share areas of overlap, as described above with respect to FIG. 1B and below with respect to FIGS. 3C, 4C, 5B and 6B. In order to output a single target image, image stitching module 240 may configure the image processor 220 to combine the multiple N partial images to produce a high-resolution target image. Target image generation may occur through known image stitching techniques. Examples of image stitching can be found in U.S. patent application Ser. No. 11/623,050 which is hereby incorporated by reference in its entirety.

For instance, image stitching module 240 may include instructions to compare the areas of overlap along the edges of the N partial images for matching features in order to determine rotation and alignment of the N partial images relative to one another. Due to rotation of partial images and/or the shape of the field of view of each sensor, the combined image may form an irregular shape. Therefore, after aligning and combining the N partial images, the image stitching module 240 may call subroutines which configure image processor 220 to crop the combined image to a desired shape and aspect ratio, for example a 4:3 rectangle or 1:1 square. The cropped image may be sent to the device processor 250 for display on the display 225 or for saving in the storage 210.

Operating system module 245 configures the image processor 220 to manage the working memory 205 and the processing resources of device 200. For example, operating system module 245 may include device drivers to manage hardware resources such as the imaging sensor assemblies 215a-n. Therefore, in some embodiments, instructions contained in the image processing modules discussed above may not interact with these hardware resources directly, but instead interact through standard subroutines or APIs located in operating system component 270. Instructions within operating system 245 may then interact directly with these hardware components. Operating system module 245 may further configure the image processor 220 to share information with device processor 250.

Device processor 250 may be configured to control the display 225 to display the captured image, or a preview of the captured image, to a user. The display 225 may be external to the imaging device 200 or may be part of the imaging device 200. The display 225 may also be configured to provide a view finder displaying a preview image for a use prior to capturing an image, or may be configured to display a captured image stored in memory or recently captured by the user. The display 225 may comprise an LCD or LED screen, and may implement touch sensitive technologies.

Device processor 250 may write data to storage module 210, for example data representing captured images. While storage module 210 is represented graphically as a traditional disk device, those with skill in the art would understand that the storage module 210 may be configured as any storage media device. For example, the storage module 210 may include a disk drive, such as a floppy disk drive, hard disk drive, optical disk drive or magneto-optical disk drive, or a solid state memory such as a FLASH memory, RAM, ROM, and/or EEPROM. The storage module 210 can also include multiple memory units, and any one of the memory units may be configured to be within the image capture device 200, or may be external to the image capture device 200. For example, the storage module 210 may include a ROM memory containing system program instructions stored within the image capture device 200. The storage module 210 may also include memory cards or high speed memories configured to store captured images which may be removable from the camera.

Although FIG. 2 depicts a device having separate components to include a processor, imaging sensor, and memory, one skilled in the art would recognize that these separate components may be combined in a variety of ways to achieve particular design objectives. For example, in an alternative embodiment, the memory components may be combined with processor components to save cost and improve performance.

Additionally, although FIG. 2 illustrates two memory components, including memory component 230 comprising several modules and a separate memory 205 comprising a working memory, one with skill in the art would recognize several embodiments utilizing different memory architectures. For example, a design may utilize ROM or static RAM memory for the storage of processor instructions implementing the modules contained in memory 230. The processor instructions may be loaded into RAM to facilitate execution by the image processor 220. For example, working memory 205 may comprise RAM memory, with instructions loaded into working memory 205 before execution by the processor 220.

Figure 3A:
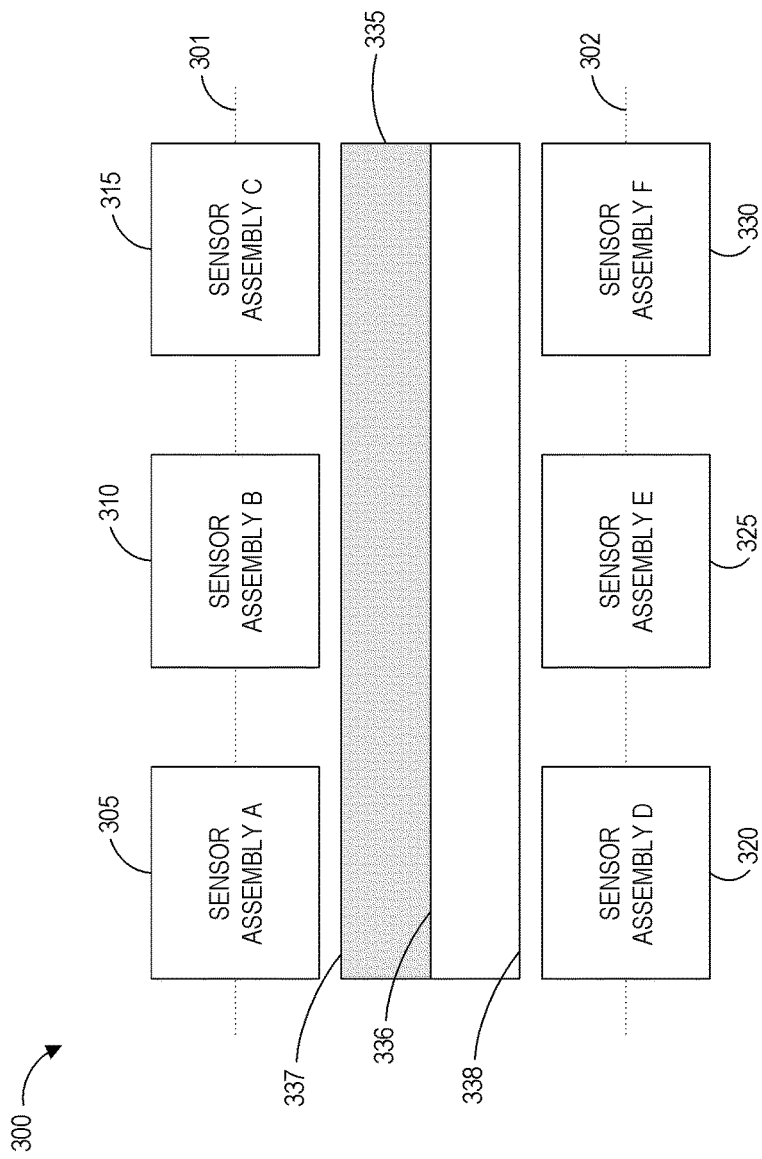
FIG. 3A illustrates a block diagram of an embodiment of a folded optic sensor array.
Figure 3C:
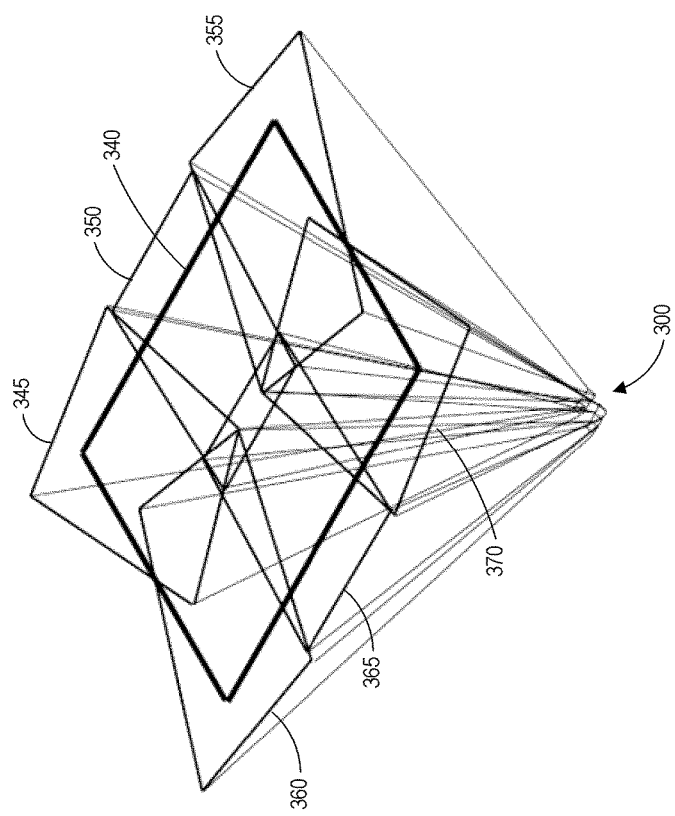
FIG. 3C illustrates an schematic diagram of one embodiment of projected fields of view of the folded optic sensor array of FIGS. 3A-B.

Turning to FIGS. 3A-C, one embodiment of a folded optic sensor array 300 will be described in more detail. The array 300 comprises two 3×1 rows of sensor assemblies and a central light redirection surface 335, for example a mirror. As shown in FIG. 1A, sensor assemblies A-F may each include an image sensor, a lens assembly, and a secondary reflective surface. Some embodiments of the sensor array 300 configuration may have a field of view of 82 degrees.

As illustrated in FIGS. 3A and 3B, sensor assembly A 305, sensor assembly B 310, and sensor assembly C 315 are aligned parallel to one another adjacent along a first axis 301 on one side 337 of the central mirror 335. Sensor assembly D 320, sensor assembly E 325, and sensor assembly F 330 are aligned parallel to one another adjacent along a second axis 302 on the opposite side 338 of central mirror 335. The first and second axis are aligned parallel to a central line of symmetry 336 of central mirror 335. Although as depicted there is a uniform gap between each sensor assembly on an axis, the amount of this gap is variable, and some embodiments may arrange the sensors with no gap between them, for example by cutting the sensors as a group from a silicon wafer.

FIG. 3B illustrates a perspective view of the central mirror 335 displaying three distinct mirrored surfaces 337, 338 and 339. Mirrored surface 337 redirects light comprising a portion of the target image toward sensor assembly 320. This portion of the target image corresponds to the field of view of sensor 320. Mirrored surface 338 redirects another portion of the target image toward sensor assembly 325, and mirrored surface 339 redirects a third portion of the target image toward sensor assembly 330. Although not shown in the view illustrated by FIG. 3B, the opposite side of the central mirror comprises three similar surfaces reflecting light toward sensor assemblies 305, 310, and 315.

The fields of view of each of the sensors in the array 300 are illustrated in FIG. 3C. Field of view 360 corresponds to sensor 320, field of view 365 corresponds to sensor 325, and field of view 370 corresponds to sensor 330. Due in part to the relative angle of central mirror surfaces 337 and 338, fields of view 360 and 365 share a triangular overlap. Fields of view 365 and 370 may also share a triangular overlap of the same specifications. As the central mirror 335 is symmetrical about line of symmetry 336, fields of view 345, 350, and 355 may bear a similar relationship to one another as fields of view 360, 365 and 370. Further, the two rows of the sensor array may share overlapping fields of view. Fields of view 365 and 350 share a rectangular overlap. In some embodiments, the sensors in the array may capture a plurality of images according to the illustrated fields of view, and the plurality of images may be stitched together and cropped to the rectangular boundary 340 in order to produce the target image.

Figure 4:
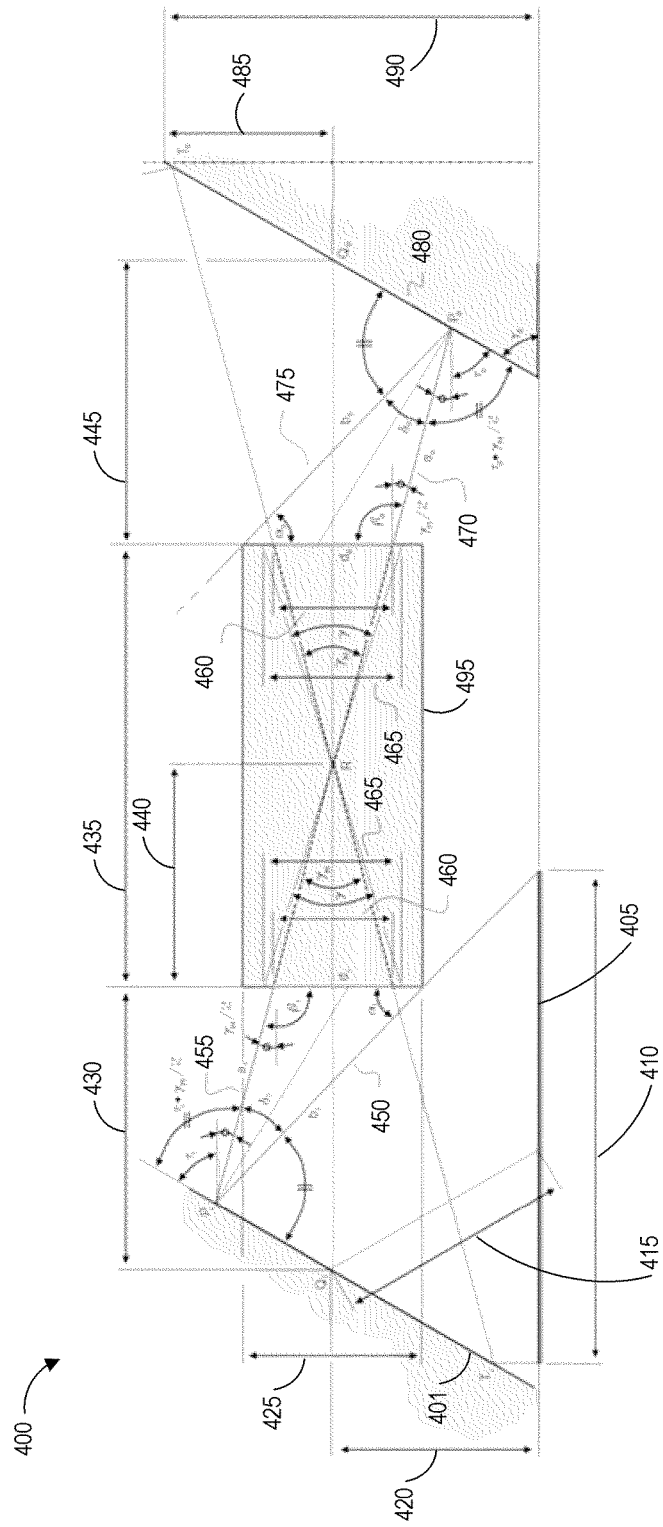
FIG. 4 illustrates a cross-sectional side view of one embodiment of a folded optic sensor assembly showing the angular relationship of its components.

FIG. 4 illustrates one embodiment of a folded optic sensor assembly 400 comprising a sensor 405, a lens system 495, a first reflective surface 480 and a second reflective surface 401.

In the folded optic sensor assembly 400, the first reflective surface 480 may be positioned at an angle $\tau_o$ relative to the plane on which sensor 405 is mounted. The second reflective surface 401 may be positioned at an angle $\tau_i$ relative to the plane on which sensor 405 is mounted. The sensor 405 may have a diagonal field of view $\gamma$ and a field of view of the height of the sensor $\gamma_H$ determined at least in part by sensor height 410. The lens system 495 may be positioned a distance 445 from first reflective surface 480, measured along a central axis from point $d_o$ on the receiving edge of lens system 495 to point $Q_o$ on reflective surface 480. The lens system may be positioned a distance 430 from second reflective surface 401, measured along a central axis from point $d_i$ on the light transmitting edge of lens system 495 to point $Q_i$ on reflective surface 401.

Incident light 475 comprising the target image scene travels toward first reflective surface 480. The incident beam 475 hits the surface 480 at point $P_o$ and then is reflected off of the surface 480 and travels as reflected beam 470 toward the lens system 495. Incident beam 475 forms an angle $\alpha_o$ relative to the receiving edge of lens system 495, and reflected beam 470 forms an angle $\beta_o$ relative to the receiving edge of lens system 495. The angle of reflection between incident beam 475 and reflected beam 470 is denoted by variable $\delta_o$.

The reflected beam 470 then enters lens system 495 and passes through at least one lens of diameter 465. The lens system 495 has a length 435 and diameter 425. Within the lens system, the target image is of height 460. A distance 440 marks the position of the lens diaphragm from the edge of the lens system 495. In embodiments which employ a converging lens, the light may converge at a focal point R then travel out the other side of the lens system 495.

After leaving lens system 495, a beam of the light 455 is incident upon the secondary reflective surface 401. The incident beam 455 hits the surface 480 at point $P_i$ and then is reflected off of the surface 401 and travels as reflected beam 450 toward the sensor 405. Reflected beam 450 forms an angle $\alpha_i$ relative to the light transmitting edge of lens system 495, and incident beam 455 forms an angle $\beta_i$ relative to the light transmitting edge of lens system 495. The angle of reflection between incident beam 455 and reflected beam 450 is denoted by variable $\delta_i$.

The relationship between the aforementioned variables defined, in some 2D embodiments, by the following equations:

$$\alpha = \pi - \beta - \delta$$

$$\beta = (\pi - \gamma_H)/2$$

$$\delta = \pi - \gamma_H - 2\tau$$

The minimum Z-height 490 of the system 400 with folded optics is determined by the minimum back focal length. The minimum back focal length may be used to calculate a maximum value for the diameter 425 of the lens system. The diameter 425 of the lens system determines the value of the Z-distance to the sensor 420 and the value of the Z-distance to top of mirror 485. Adding together the values of the Z-distance to the sensor 420 and the Z-distance to top of mirror 485 provides the minimum Z-height for the system 480.

In an embodiment, both the Z-distance to the sensor 420 and the distance to the secondary reflective surface 430 are minimal, and thus the assembly 400 has the minimum back focal length that is required to use folded optics. This may occur when the diameter of the lens system 425 is increased to the point at which the reflected beam 450 just does not intersect with the lens system 495 and the sensor 405 just does not intersect with the lens system 495 and second reflective surface 401. At this point, the diameter of the lens system 425 also may have reached its maximum value.

The minimum Z-height of the system 490 with folded optics is related to the minimum back focal length, and from the minimum back focal length the maximum value for the diameter of lens system 425 may be calculated. The back focal length of the lens system 495 with folded optics may be calculated by adding the distance to the second reflective surface 401 and the distance to sensor 415. In one embodiment, the field of view $\gamma_H$ may be fixed at 40 degrees, the height of the sensor 405 may be 1.6 mm, and the sensor 405 may be a 1 Mpx sensor. The back focal length may be 2 mm when the lens diameter 465 is 0.5 mm. In some embodiments, the number of sensors in a folded optic sensor array may be increased to achieve lower Z-heights.

In one embodiment, the sensor 405 may be a 5 MP sensor with 1.4 µm pixel pitch and the field of view $\gamma_H$ may be 65 degrees. The effective focal length of this embodiment may be 3.57 mm when focused at infinity. Similarly, the effective focal length of an embodiment with an 8 MP sensor with a 1.12 µm pixel pitch may also be 3.57 mm, as the sensor can be the same physical size as the 5 MP sensor. It is possible for the Z-height of the system 490 of theses embodiments to be around 3.9 mm.

Figure 5A:
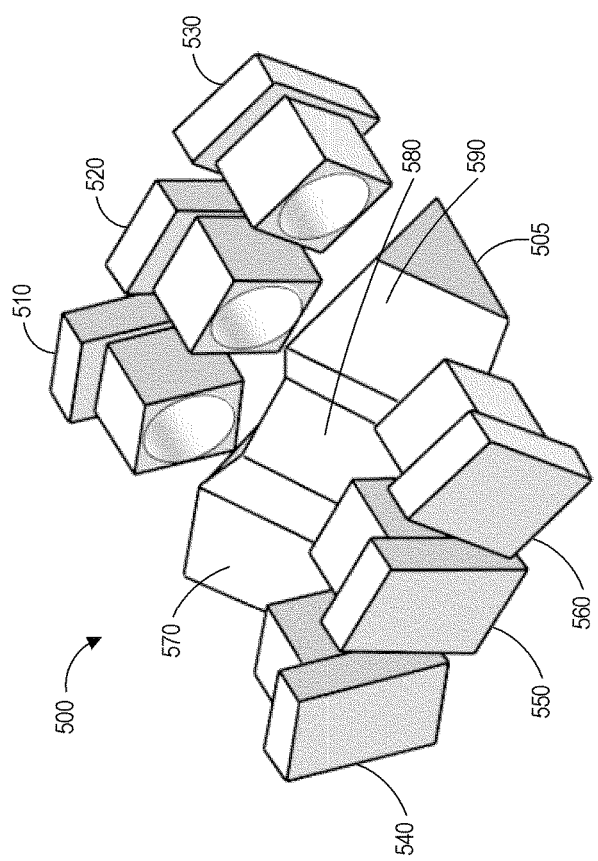
FIG. 5A illustrates a perspective view of another embodiment of a folded optic sensor array.
Figure 5B:
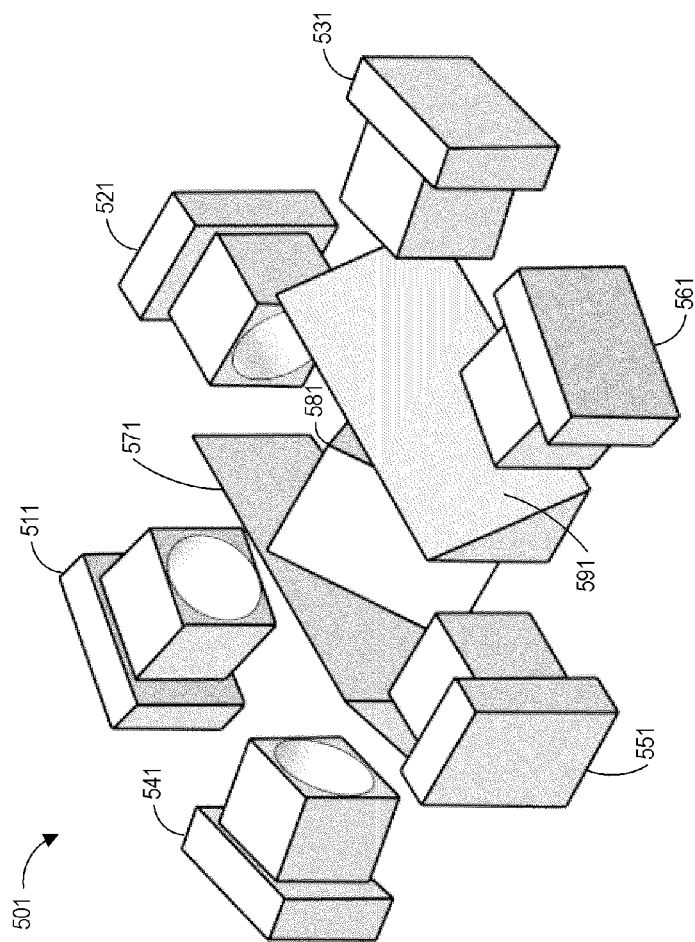
FIG. 5B illustrates a perspective view of yet another embodiment of a folded optic sensor array.

FIGS. 5A and 5B illustrate two embodiments of six sensor folded optic arrays with corresponding fields of view. As discussed above with respect to FIG. 4, the sensor assemblies of these embodiments may each comprise a sensor, lens system, and a reflective surface positioned to guide light onto the sensor. The central mirrors discussed in these embodiments may be manufactured as an assembly of separate reflective surfaces or may be manufactured as a singular prism with multiple reflective surfaces.

FIG. 5A illustrates another embodiment of a folded optic sensor array 500 with a first row of sensor assemblies 510, 520, and 530 and a second row of sensor assemblies 540, 550, and 560 around a central mirror 505. The sensor assemblies in each row may be rotated or tilted relative to one another, such that the sensors are not mounted in the same plane. For example, the outer sensor assemblies 510, 530 and 540, 560 may be rotated plus or minus approximately 21 degrees with respect to the center sensors 520, 550. The central axes of the assemblies may be in one plane which is parallel to an image plane. Certain embodiments of the sensor assembly 500 may measure 11 mm×12 mm–4.5 mm (W×L–Z-height). Of course, embodiments are not limited to these rotations, and other degrees of rotation are contemplated.

Central mirror 505 may comprise six surfaces, each surface configured to redirect light comprising a portion of a target image scene toward one of the sensor assemblies. For example, surface 570 may direct light at sensor assembly 540, surface 580 may direct light at sensor assembly 550, and surface 590 may direct light at sensor assembly 560. In one embodiment, surfaces 570 and 590 may be angled at 76×31.3 degrees (top×bottom) and surface 580 may be angled at 76.4 degrees×0 degrees (top×bottom). Although not visible in the perspective view of FIG. 5A, the side of central mirror 505 may comprise three additional surfaces corresponding to sensor assemblies 510, 520, and 530. One embodiment may comprise a complex mirror with ten facets, six of which may be reflective surfaces. Some embodiments of the central mirror may comprise a complex mirror with six facets, and other embodiments may comprise three separate wedge shaped mirrors. In other embodiments with N sensors, the central mirror may comprise N surfaces, wherein each of the N surfaces is configured to direct light comprising a portion of a target image scene toward one of the N sensors.

FIG. 5B illustrates another embodiment of a folded optic sensor array 501 in which six sensor assemblies 511, 521, 531, 541, 551, and 561 are mounted around in a generally circular pattern around a cluster of three central mirrors 571, 581, and 591. In some embodiments, there may be approximately a 76 degree angle between sensor assemblies 511 and 541 and sensor assemblies 531 and 561. The sensor assemblies may be mounted in the same plane, for example on a substantially flat substrate. In some embodiments, the sensors in the sensor assemblies may be arranged perpendicular to the mounting surface. Each sensor may view a different part of the total field.

Central mirrors 571, 581, and 591 may also be mounted on the substrate. Central mirrors 571, 581, and 591 may each be a separate wedge-shaped mirror. Surface 571 may direct light at both sensor assemblies 511 and 541. Surface 581 may comprise two separate reflective surfaces, a first surface which may direct light at sensor assembly 551 and a second surface which may direct light at sensor assembly 521. Surface 591 may direct light at both sensor assemblies 531 and 561. Certain embodiments of the sensor array 501 may measure 15 mm×17 mm–3.6 mm (W×L–Z-height).

In an embodiment, the sensors in the array 501 may be 5 megapixels with a 1.4 μm pixel size and 4:3 ratio, and having dimensions of 3.61×2.71 mm (W×H). In another embodiment, the sensors may be 8 megapixels with a 1.12 μm pixel size and 4:3 ratio, and having dimensions of 3.66×2.74 mm (W×H). The field of view of each sensor may be 40 degrees. The overall size of the array 501 in certain embodiments may be no larger than 18×18–2.5 mm (W×L–Z-height). There may be a 5% to 10% overlap between the fields of view of the various sensors at object distances greater than or equal to 20 cm. Angular overlap may be constant as function of object distance, or at least constant asymptotically.

Certain embodiments of the arrays 500, 501 may employ a similar lens assembly to the lens system 495 depicted in FIG. 4. All lens systems in certain embodiments of the array may have the same focal length, lens diameter and length, which may yield desirable results with respect to maximizing the usable sensor area. Maximizing usable sensor area may also be achieved by using different designs for the lens systems of the inner and outer sensors. In some embodiments, the lens diameter may be approximately 1.3 mm, and the focal distance may be approximately 2.7 mm. The maximum possible length of the lens system may be approximately 2.3 mm, and the diameter (height) of the lens system may be approximately 1.6 mm. The total field of view of the array 501 may be 83 degrees.

Figure 5C:
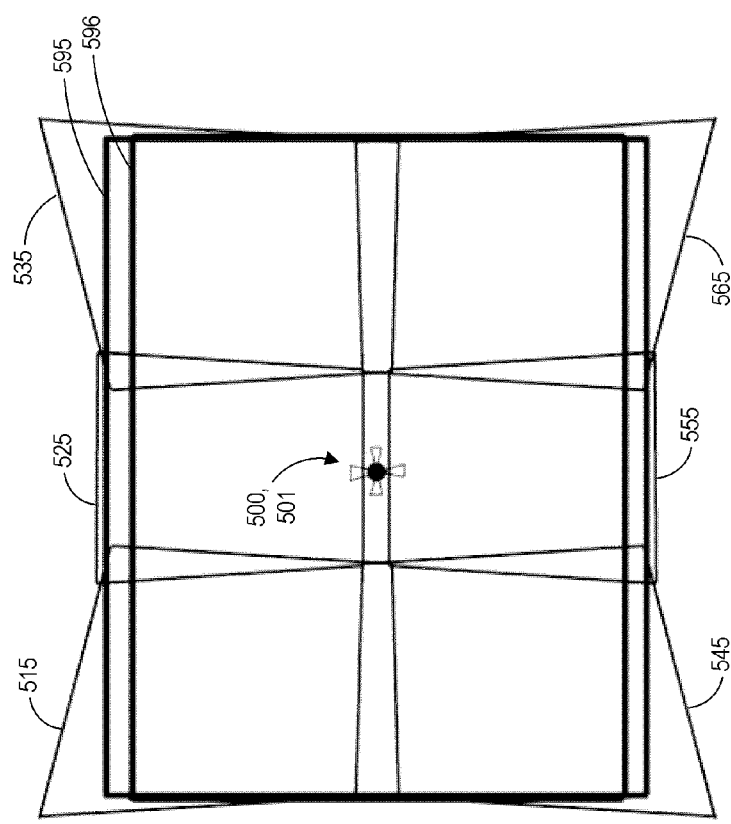
FIG. 5C illustrates a schematic diagram of an embodiment of projected fields of view of the folded optic sensor arrays of FIGS. 5A-B.

FIG. 5C illustrates an embodiment of the projected fields of view of the folded optic sensor array embodiments of FIGS. 5A-B. Although the sensor and central mirror configurations are different between the two array embodiments 500, 501, they share the same field of view configuration. Field of view 515 corresponds to sensors 510, 511; field of view 525 corresponds to sensors 520, 521; field of view 535 corresponds to sensors 530, 531; field of view 545 corresponds to sensors 540, 541; field of view 555 corresponds to sensors 550, 551; and field of view 565 corresponds to sensors 560, 561.

Fields of view 515 and 525 may share a triangular overlap where the angular overlap varies between 1-4 degrees in the X and Y-directions. In some embodiments the overlap may be more than 4 degrees. For example in some embodiments the overlap may be 10 degrees or more in cases where it may be appropriate as a design, based at least in part on the efficiency of usage of sensor area and related loss. In some embodiments where the angular overlap is 3 degrees, at 1 meter fields of view 515 and 525 may have an overlap comprising 3.3% of the total captured area of the two overlapping fields of view. Fields of view 525 and 535, fields of view 545 and 555, and field of view 555 and 565 may also share a triangular overlap of the same specifications. Further, fields of view 515 and 545 may share a triangular overlap of 5.1% at 4 degrees. Fields of view 535 and 565 share a similar overlap. Fields of view 525 and 555 overlap over the sensor array 500, 501 and may share 3.3% at 3 degrees. The field of view of the entire array 500, 501 may be 82 degrees. Some embodiments of the overlapping fields of view may be cropped to a rectangular 4:3 aspect ratio 596, resulting in an 18.8% loss. Other embodiments may be cropped to a 1:1 square aspect ratio 595, resulting in a loss of 11.3%.

In other embodiments, fields of view 515 and 525 may have an overlap of 5.2 degrees comprising 6.7% of the total captured area of the two overlapping fields of view. Fields of view 525 and 535, fields of view 545 and 555, and field of view 555 and 565 may also share a triangular overlap of the same specifications. Further, fields of view 515 and 545 may share a triangular overlap of 8.5% at 4.9 degrees. As sown, fields of view 535 and 565 share a similar overlap. Fields of view 525 and 555 overlap over the sensor array 500, 501 and may share 7.5% at 5.3 degrees. Other embodiments may share larger or smaller percentages of captured area at a variety of angles. Some embodiments of the overlapping fields of view may be cropped to a rectangular 4:3 aspect ratio 596, resulting in a 24.2% loss. Other embodiments may be cropped to a largest rectangle, resulting in a loss of 6.6%. The total field of view may be 76 degrees. However, these numbers are based on visual optimization of overlap areas, and vary dependent upon factors such as allowable loss area and object distance.

In one embodiment of sensor array 500, the center-center overlap (525, 555) may be 5% at 3.7 degrees, the side-side overlap may be 5.1% at 4 degrees, and the center-side overlap may be 3.3% at 3.3 degrees. Cropping at a 4:3 rectangular aspect ratio may result in an 18.8% loss, while cropping at the largest rectangle possible may result in an 11.3% loss. In one embodiment of sensor array 501, the center-center overlap (525, 555) may be 5% at 4.7 degrees, the side-side overlap may be 5% at 4 degrees, and the center-side overlap may be 3.6% at 2.2 degrees. Cropping at a 4:3 rectangular aspect ratio may result in a 19.4% loss, while cropping at the largest rectangle possible may result in an 11.2% loss. In another embodiment of sensor array 501, the center-center overlap (525, 555) may be 2.4% at 1.6 degrees, the side-side overlap may be 8% at 6.2 degrees, and the center-side overlap may be 6.9% at 4.3 degrees. Cropping at a 4:3 rectangular aspect ratio may result in a 14.2% loss, while cropping at the largest rectangle possible may result in a 14.2% loss. The total field of view may be 83 degrees. In one embodiment, the final image may be around 19 megapixels after 4:3 cropping.

Limiting the total Z-height of the system may result in a portion of each sensor in the array becoming unusable due to the limited height of each secondary mirror. For example, in one embodiment of array 501 employing sensor assemblies such as are described in FIG. 4, and in which the Z-height of the system is constrained to 2.5 mm, sensors 551 and 521 may have a usable area of 54.2% and sensors 511, 531,541 and 561 may have a usable area of 52.1%. The height of the usable sensor may be around 2 mm under the height constraint for the system.

Figure 6A:
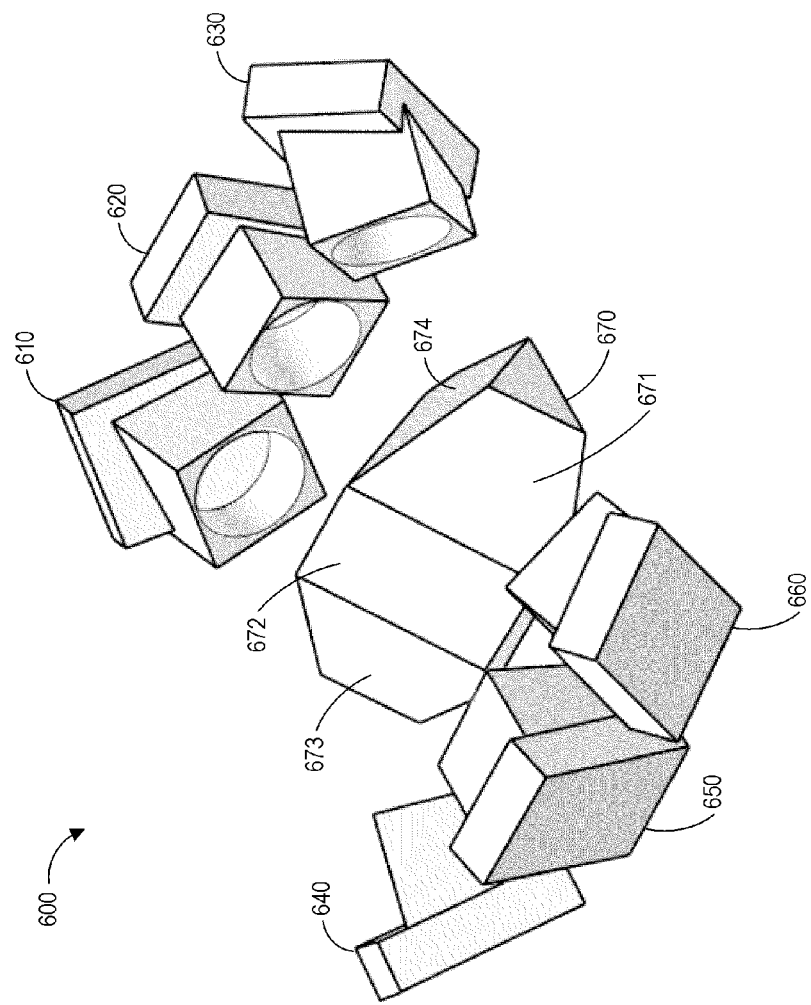
FIG. 6A illustrates a perspective view of another embodiment of a folded optic sensor array.

FIG. 6A illustrates another embodiment of a folded optic sensor array 600. The sensor array 6600 with a first row of sensor assemblies 610, 620, and 630 and a second row of sensor assemblies 640, 650, and 660 around a central mirror 505. The sensor assemblies in each row may be rotated or tilted relative to one another, such that the sensors are not mounted in the same plane. In some embodiments, such a sensor configuration provides a plurality of rectangular images, as the image plane and focal plane may be parallel. Certain embodiments of the sensor array 600 may measure 12 mm×15 mm–4.6 mm (W×L–Z-height).

Central mirror 670 may comprise six surfaces, each surface configured to redirect light comprising a portion of a target image scene toward one of the sensor assemblies. Some embodiments of the central mirror may comprise a complex mirror with six facets, and other embodiments may comprise three separate wedge shaped mirrors. For example, surface 673 may direct light at sensor assembly 640, surface 672 may direct light at sensor assembly 650, surface 671 may direct light at sensor assembly 560, and surface 674 may direct light at sensor 630. Although not visible in the perspective view of FIG. 6A, the opposite side of central mirror 505 may comprise two additional surfaces corresponding to sensor assemblies 510 and 520. In other embodiments with N sensors, the central mirror may comprise N surfaces, wherein each of the N surfaces is configured to direct light comprising a portion of a target image scene toward one of the N sensors.

Figure 6B:
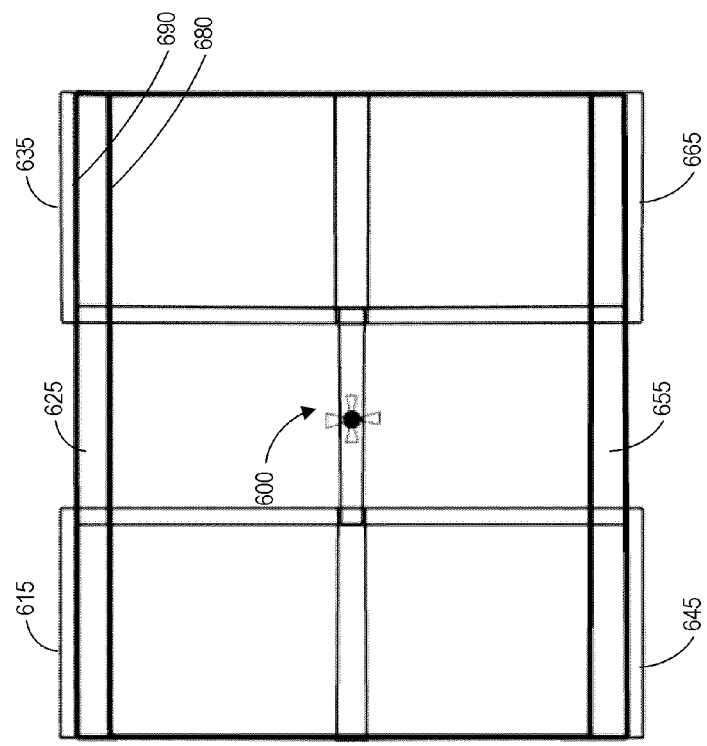
FIG. 6B illustrates a schematic diagram of an embodiment of projected fields of view of the folded optic sensor array of FIG. 6A.

FIG. 6B illustrates an embodiment of projected fields of view of the folded optic sensor array 600 of FIG. 6A. Field of view 615 corresponds to sensor 610, field of view 625 corresponds to sensor 620, field of view 635 corresponds to sensor 630, field of view 645 corresponds to sensor 640, field of view 655 corresponds to sensor 650, and field of view 665 corresponds to sensor 660.

Fields of view 615 and 625 may share a rectangular overlap that is constant in the X- and Y-direction and constant asymptotically in the Z-direction. In some embodiments where the angular overlap is 1.8 degrees, at 1 meter fields of view 615 and 625 may have an overlap comprising 3.3% of the total captured area of the two overlapping fields of view. Fields of view 625 and 635, fields of view 645 and 655, and fields of view 655 and 665 may also share a rectangular overlap of the same specifications. Center fields of view 625 and 655 may share a rectangular overlap of 5.1% at 3.4 degrees. Side fields of view 615 and 645, as well as 635 and 665, may share a rectangular overlap of 5% at 3.6 degrees. Cropping to a rectangular 4:3 aspect ratio 680 may result in a 15.6% loss, and cropping to a 1:1 square aspect ratio 690 may result in a 4% loss.

In another embodiment, the angular overlap between fields of view 615 and 625 may be 3-5 degrees, and 1 meter fields of view 615 and 625 may have an overlap comprising 4%-6% of the total captured area of the two overlapping fields of view. Fields of view 625 and 635, fields of view 645 and 655, and fields of view 655 and 665 may also share a rectangular overlap of the same specifications. Center fields of view 625 and 655 may share a rectangular overlap of 6%-8% at 4-8 degrees. Side fields of view 615 and 645, as well as 635 and 665, may share a rectangular overlap of 6%-9% at 4-10 degrees. Cropping to a rectangular 4:3 aspect ratio 680 may result in a 17.8% loss, and cropping to a largest rectangle may result in a 4.5% loss. The total field of view may be between 70 and 120 degrees. However, these numbers are based on visual optimization of overlap areas, and vary dependent upon factors such as allowable loss area and object distance.

Figure 7:
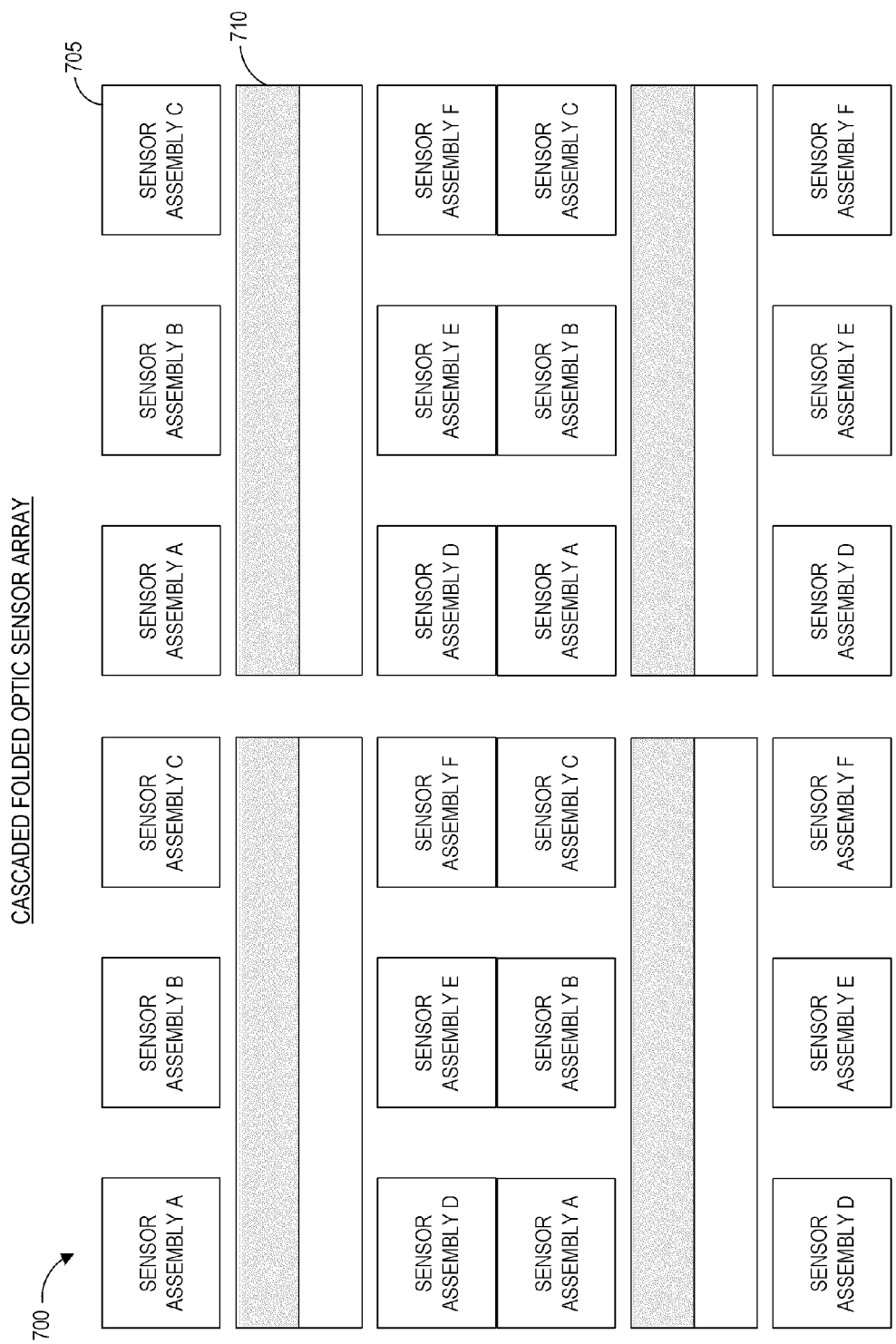
FIG. 7 illustrates a block diagram of an embodiment of a cascaded folded optic sensor array.
Figure 8:
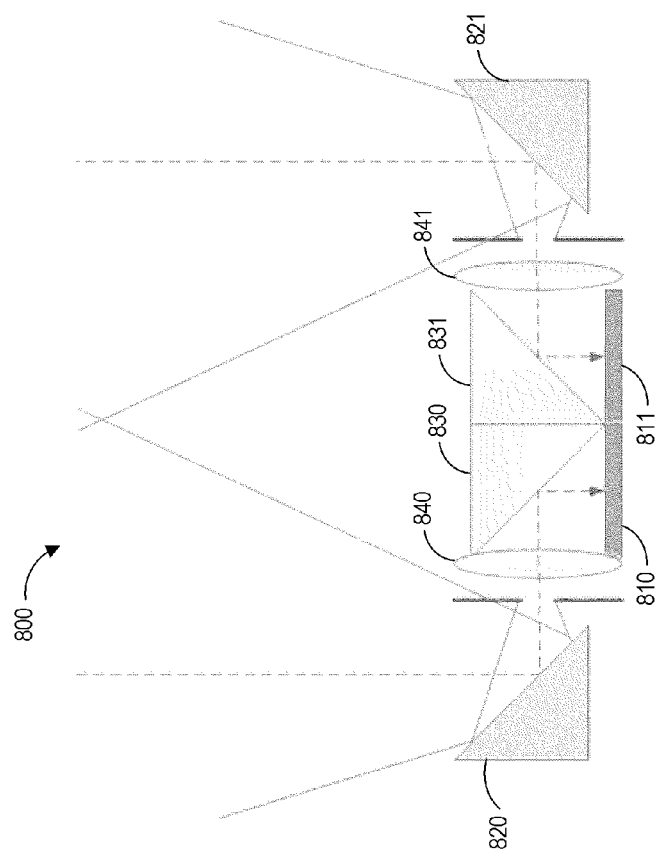
FIG. 8 illustrates a cross-sectional side view of another embodiment of a folded optic sensor assembly.

FIG. 7 illustrates another embodiment of a folded optic sensor array 700 with a plurality of sensor assemblies 705 and a plurality of central mirrors 710. As discussed above with respect to FIG. 4, each sensor assembly may comprise a sensor, a lens system, and a reflective surface configured to redirect light from the lens system onto the sensor. In this embodiment, a sensor array comprising two 3×1 arrays on either side of a central mirror 710 has been repeated, such that there is a 2×2 cascading array of the sensor arrays. Other embodiments may employ any suitable cascaded array configuration FIG. 8 illustrates another embodiment of a folded optic sensor assembly 800. Essentially the mirrors are reversed in position as compared to the embodiments described above. For example, light comprising the target image is incident on two primary reflective surfaces 820, 821 which surround the sensor 810, 811. The light is redirected inward through two lens assemblies 840, 841 and then reflected off central secondary reflective surfaces 830, 831 and down onto sensors 810, 811. Sensors 810, 811 may represent individual sensors or an array of sensors.

Figure 9:
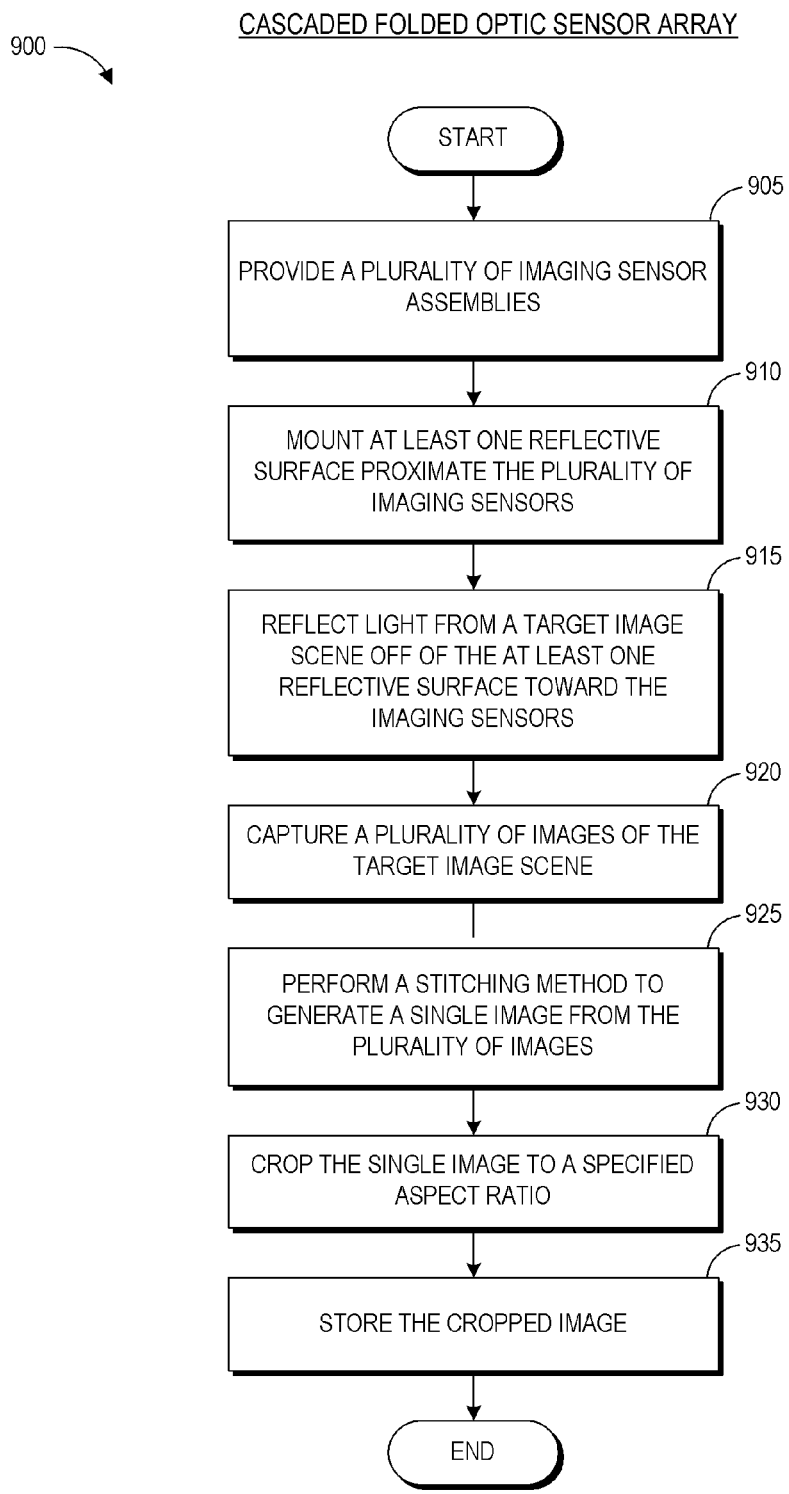
FIG. 9 illustrates an embodiment of a folded optic image capture process.

FIG. 9 illustrates an embodiment of a folded optic image capture process 900. The process 900 begins at step 905, in which a plurality of imaging sensor assemblies. This step includes any of the sensor array configurations discussed above with respect to the previous images. The sensor assemblies may include, as discussed above with respect to FIG. 4, a sensor, lens system, and a reflective surface positioned to redirect light from the lens system onto the sensor. The process 900 then moves to step 910, in which at least one reflective surface is mounted proximate to the plurality of image sensors. For example, this step could comprise mounting a central mirror between two rows of sensor arrays, wherein the central mirror comprises a surface associated with each sensor in the arrays.

The process 900 then transitions to step 915, in which light comprising a target image of a scene is reflected off of the at least one reflective surface toward the imaging sensors. For example, a portion of the light may be reflected off of each of a plurality of surfaces toward each of the plurality of sensors. This step may further comprise passing the light through a lens assembly associated with each sensor, and may also include reflecting the light off of a second surface onto a sensor. Step 915 may further comprise focusing the light using the lens assembly or through movement of any of the reflective surfaces.

The process 900 may then move to step 920, in which the sensors capture a plurality of images of the target image scene. For example, each sensor may capture an image of a portion of the scene corresponding to that sensor's field of view. Together, the fields of view of the plurality of sensors cover at least the target image in the object space.

The process 900 then may transition to step 925 in which an image stitching method is performed to generate a single image from the plurality of images. In some embodiments, the image stitching module 240 of FIG. 2 may perform this step. This may include known image stitching techniques. Further, any areas of overlap in the fields of view may generate overlap in the plurality of images, which may be used in aligning the images in the stitching process. For example, step 925 may further include identifying common features in the overlapping area of adjacent images and using the common features to align the images.

Next, the process 900 transitions to step 930 in which the stitched image is cropped to a specified aspect ratio, for example 4:3 or 1:1. Finally, the process ends after storing the cropped image at step 935. For example, the image may be stored in storage 210 of FIG. 2, or may be stored in working memory 205 of FIG. 2 for display as a preview image of the target scene.

CLARIFICATIONS REGARDING TERMINOLOGY

Those having skill in the art will further appreciate that the various illustrative logical blocks, modules, circuits, and process steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. One skilled in the art will recognize that a portion, or a part, may comprise something less than, or equal to, a whole. For example, a portion of a collection of pixels may refer to a sub-collection of those pixels.

The various illustrative logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or process described in connection with the implementations disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of non-transitory storage medium known in the art. An exemplary computer-readable storage medium is coupled to the processor such the processor can read information from, and write information to, the computer-readable storage medium. In the alternative, the storage medium may be integral to the processor. The processor and the storage medium may reside in an ASIC. The ASIC may reside in a user terminal, camera, or other device. In the alternative, the processor and the storage medium may reside as discrete components in a user terminal, camera, or other device.

Headings are included herein for reference and to aid in locating various sections. These headings are not intended to limit the scope of the concepts described with respect thereto. Such concepts may have applicability throughout the entire specification.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. An image capture system for capturing an image of a target scene, the system comprising:
    a first lens positioned to focus light received from the target scene; and
    a plurality of cameras positioned to capture image data representing a plurality of portions of the target scene, wherein each of the plurality of cameras comprises
        a first optical axis, wherein the first lens is positioned along the first optical axis,
        a primary surface positioned so as to receive light comprising one of the plurality of portions of the target scene propagating along the first optical axis and direct the received light along a second optical axis, wherein the first lens is positioned between the primary surface and the target scene,
        a lens assembly comprising at least a second lens, the lens assembly positioned to receive and refract the light propagating along the second optical axis, and
        an image sensor positioned to receive the light from the lens assembly, the sensor configured to capture a portion of the image data representing the one of the plurality of portions.

2. The image capture system of claim 1, further comprising a processor configured to generate the image of the target scene based at least partly on each of the plurality of portions of the target scene.

3. The image capture system of claim 2, further comprising a memory storing instructions that configure the processor to generate the image of the target scene based at least partly on the captured image data.

4. The image capture system of claim 1, each of the plurality of cameras further comprising a secondary surface positioned to reflect light from the second optical axis to a third optical axis toward the image sensor, wherein the lens assembly is positioned between the primary surface and the secondary surface.

5. The image capture system of claim 1, further comprising a substantially flat substrate, wherein the image sensor of each of the plurality of cameras is positioned on the substantially flat substrate.

6. The image capture system of claim 5, wherein the image sensors of the plurality of cameras are arranged in two rows on the substrate, and wherein the primary surface of each of the plurality of cameras is positioned between the two rows.

7. The image capture system of claim 5, wherein the image sensor of each of the plurality of cameras are arranged in a circular configuration on the substrate, the primary surface of each of the plurality of cameras positioned at a central area of the circular configuration.

8. The image capture system of claim 1, further comprising a prism comprising a plurality of facets, the prism positioned at a center of the plurality of cameras, wherein each of the plurality of facets comprises the primary surface of a different one of the plurality of cameras.

9. The image capture system of claim 1, wherein the primary surface of each of the plurality of cameras comprises a reflective mirror.

10. A camera comprising:
    a plurality of sensors for generating image data of a target scene from light received on a surface of each image sensor; and
    a folded lens system comprising a plurality of optical elements arranged along a plurality of light paths, each light path associated with a sensor of the plurality of sensors, each of the plurality of light paths having a first and second optical axes, the plurality of optical elements including, in each of the plurality of light paths,
        a first lens positioned along the first optical axis, the first lens operable to focus light received along the first optical axis from the target scene,
        a light path folding element positioned to receive the light from the first lens propagating along the first optical axis and to redirect the received light along the second optical axis, and a lens assembly comprising at least a second lens, the lens assembly positioned to receive and refract the light propagating along the second optical axis and focus the light directed toward the image sensor, wherein the plurality of sensors are positioned to capture image data representing a plurality of portions of the target scene, wherein in each of the plurality of light paths, the first lens is positioned between the light path folding element and the target scene.

11. The camera of claim 10, wherein the folded lens system provides the camera with a low profile without shortening a focal length of the camera.

12. The camera of claim 11, wherein the low profile height is 3.9 mm and wherein the focal length is 3.57 mm when the folded lens system is focused at infinity.

13. The camera of claim 10, wherein the light path folding element comprises a reflective mirror.

14. The camera of claim 10, wherein the light path folding element comprises a surface of a refractive prism.

15. The camera of claim 10, wherein the plurality of optical elements arranged in each of the plurality of light paths further comprises a diaphragm.

16. The camera of claim 15, wherein in each of the plurality of light paths the diaphragm is positioned between the light path folding element and the lens assembly.

17. The camera of claim 15, wherein in each of the plurality of light paths the diaphragm is positioned between the first lens and the second lens.

18. The camera of claim 10, wherein a back focal length of the folded lens system is 2 mm.

19. The camera of claim 10, wherein each of the plurality of sensors is positioned to receive light from one of the plurality of light paths.

20. The camera of claim 10, wherein each of the plurality of light paths of the folded lens system further comprises a secondary light folding surface positioned to receive the light from the lens assembly along the second optical axis and redirect the light onto a third optical axis toward the image sensor.

21. A method, comprising:
receiving light through a first lens from a target scene;
propagating a portion of the light along a first optical axis of each of a plurality of cameras, the plurality of cameras positioned to capture image data representing a plurality of portions of the target scene;

for each of the plurality of cameras,
receiving the light, propagating along the first optical axis, on a primary surface of the camera, the light received on the primary surface light comprising one of the plurality of portions of the target scene, wherein the first lens is positioned between the primary surface and the target scene;
directing the light received on the primary surface along a second optical axis to a lens assembly comprising at least a second lens;
refracting and propagating the light received at the lens assembly to an image sensor positioned to receive the light from the lens assembly, the sensor configured to capture a portion of the image data representing the one of the plurality of portions.

22. The method of claim 21, further comprising generating, with a processor, an image of the target scene from each of the plurality of portions of the target scene captured by the image sensor of each of the plurality of cameras.

23. The method of claim 21, further comprising
for each of the plurality of cameras,
receiving light propagating from the lens assembly on a secondary surface positioned along the second optical axis;
directing light from the secondary surface along a third optical axis to the image sensor.

24. The method of claim 21, wherein the image sensors of the plurality of cameras are positioned on a substantially flat substrate.

25. The method claim 24, wherein the image sensors of the plurality of cameras are arranged in two rows on the substrate, and wherein the primary surface of each of the plurality of cameras is positioned between the two rows.

26. The method of claim 24, wherein the image sensor of each of the plurality of cameras is arranged in a circular configuration on the substrate, and the primary surface of each of the plurality of cameras is positioned at a central area of the circular configuration.

27. The method of claim 21, wherein the primary surface of each of the plurality of cameras is a different facet of a prism positioned at a center of the plurality of cameras.

28. The method of claim 21, wherein the primary surface of each of the plurality of cameras comprises a reflective mirror.

* * * * *